United States Patent [19]
Rapaport et al.

[11] Patent Number: 5,890,152
[45] Date of Patent: Mar. 30, 1999

[54] PERSONAL FEEDBACK BROWSER FOR OBTAINING MEDIA FILES

[75] Inventors: Jeffrey Alan Rapaport, 362 West Olive Ave., Sunnyvale, Calif. 94086; Seymour Alvin Rapaport, 1050 Crooked Creek Dr., Los Altos, Calif. 94024

[73] Assignees: Seymour Alvin Rapaport, Los Altos; Jeffrey Alan Rapaport, Sunnyvale; Linda Rapaport, Los Altos, all of Calif.

[21] Appl. No.: 709,762

[22] Filed: Sep. 9, 1996

[51] Int. Cl.⁶ .................................................. G06F 3/00
[52] U.S. Cl. .................. 707/6; 707/7; 707/104; 345/333; 345/978; 345/968
[58] Field of Search ...................... 345/326, 358, 345/968, 978, 12, 54; 379/427; 707/3–6, 7, 104, 501

[56] References Cited

U.S. PATENT DOCUMENTS

| | | | |
|---|---|---|---|
| 4,595,990 | 6/1986 | Garwin et al. | 345/326 X |
| 5,263,167 | 11/1993 | Conner, Jr. et al. | 345/333 X |
| 5,428,778 | 6/1995 | Brookes | 345/968 X |
| 5,483,278 | 1/1996 | Strubbe et al. | 345/334 X |
| 5,530,852 | 6/1996 | Meske, Jr. et al. | 345/968 X |
| 5,564,043 | 10/1996 | Siefert | 345/968 X |
| 5,600,781 | 2/1997 | Root et al. | 345/326 |
| 5,657,461 | 8/1997 | Harkins et al. | 345/333 |
| 5,694,459 | 12/1997 | Backaus et al. | 379/427 |
| 5,694,594 | 12/1997 | Chang | 345/968 X |
| 5,696,885 | 12/1997 | Hekmatpour | 395/54 |
| 5,696,965 | 12/1997 | Dedrick | 345/334 X |

OTHER PUBLICATIONS

Wiederhold, "Database Design", McGraw–Hill, pp. 1–8, 79–80, 151, 1983.
Excite Home, Sep. 13, 1996, web pages, 56 pages.
Your excite Live! , Sep. 13, 1996, web pages, 68 pages.
firefly, Sep. 14, 1996, web pages, 23 pages.
MSNBC, Sep. 13, 1996, web pages, 18 pages.
Real Audio Plus, Sep. 13, 1996, web pages, 3 pages.
Yahoo, Sep. 14, 1996, web pages, 17 pages.

*Primary Examiner*—John E. Breene
*Attorney, Agent, or Firm*—Fliesler, Dubb, Meyer & Lovejoy

[57] ABSTRACT

A Personal Feedback browser and Personal Profile database is provided for obtaining media files from the internet. A Personal Feedback browser selects media files based on user-specified information stored in the Personal Profile database. The Personal Profile database includes Profile Objects which represent the interests, attitude/aptitude, reading comprehension and tastes of a user. Profile Objects are bundles of key words/key phrases having assigned weight values. Profile Objects can be positioned a specified distance from a Self Object. The distance from the Profile Object to the Self Object represents the effect the Profile Object has in filtering and/or selecting media files for that user. The Personal Feedback browser includes a media evaluation software program for evaluating media files based on a personal profile database. The Personal Profile database is also adjusted based upon user selection and absorption of media files. A sound-to-text software program is provided for translating a sound file to a text file.

49 Claims, 33 Drawing Sheets

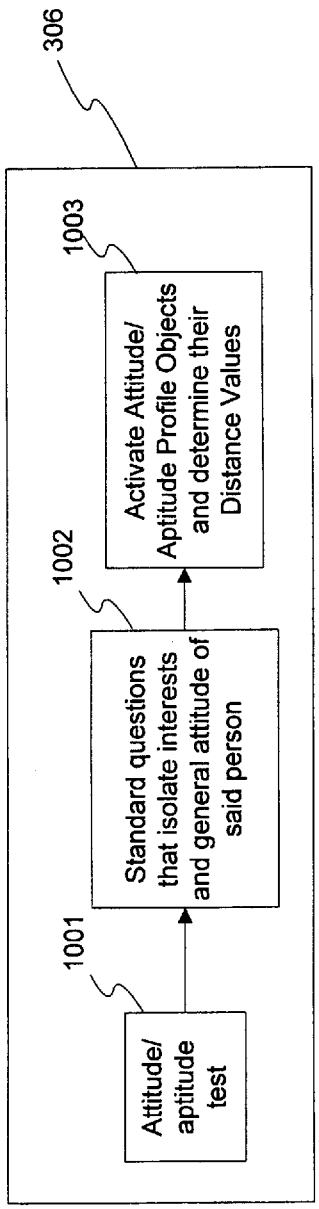
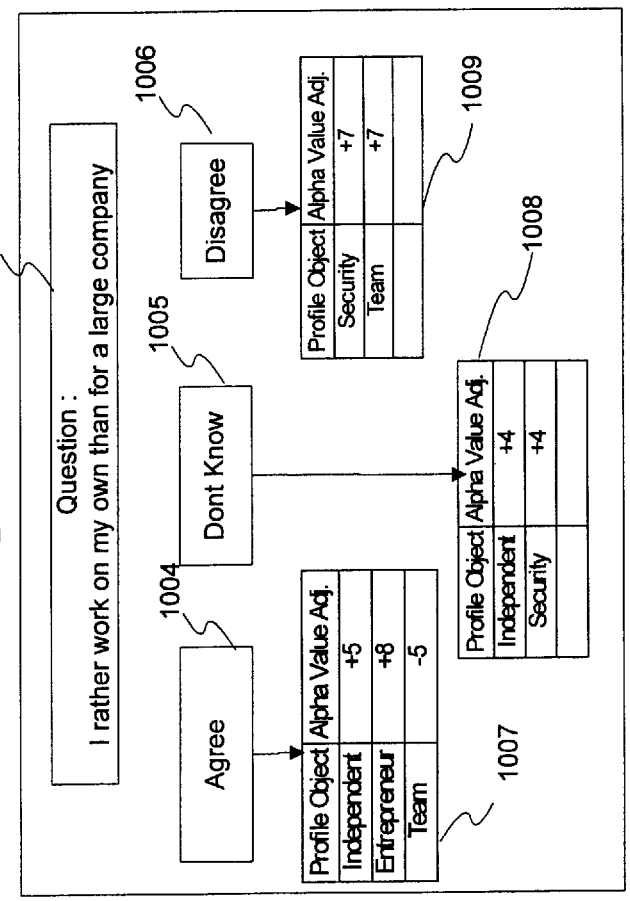
Fig. 10a
Fig. 10b

USER: John Doe

ACTIVE PROFILE: HOBBY 1

Search Results for Butterflies

| | Text | Audio | Video |
|---|---|---|---|
| | 1509 | 1510 | 1511 |
| Choice 1: Butterflies in Egyptian entomological..... | 1/2  (Sub 92)(MCR 98)(Identity 89)(Hero 43) | 1/2  (Sub 44)(MCR 88)(Identity 66)(Hero 87) | 2/2  (Sub 92)(MCR 67)(Identity 92)(Hero 67) |
| Choice 2: Butterflies how they grow | 3/4  (Sub 89)(MCR 89)(Identity 92)(Hero 43) | 1/2  (Sub 88)(MCR 68)(Identity 92)(Hero 78) | |
| Choice 3: Butterflies how to paint | 1/1  (Sub 92)(MCR 56)(Identity 92)(Hero 67) | | 2/2  (Sub 92)(MCR 67)(Identity 92)(Hero 87) |
| Choice 4: Butterflies on sale special price 2 for 1.... | 3/4  (Sub 92)(MCR 34)(Identity 92)(Hero 87) | 1/1  (Sub 92)(MCR 45)(Identity 34)(Hero 55) | 1/2  (Sub 92)(MCR 67)(Identity 22)(Hero 56) |

Highlight points of interest on document using markup method [x]  Fitness Indicators are color coded by value [x]  Ignore content enclosed by quotes for MCR rating [x]

Fig. 15a

PERSONAL FEEDBACK BROWSER FOR OBTAINING MEDIA FILES

BACKGROUND OF THE INVENTION

1. Field of Invention

This invention relates to obtaining information and, in particular, searching, retrieving and evaluating information on a computer network such as the internet.

2. Background

The challenge of making the internet more useful for users is quickly and efficiently obtaining information suitable for a particular user. This is challenging due to the large amount of information on the internet and the diverse type of users. Current search engines and web crawlers such as Yahoo!, Alta-Vista, and Excite are used to assist users in locating information or media files based on subject matter. For example, a user enters specific subject key words using selected subject matter categories or data bases in order to hopefully retrieve information or user resource locator ("URL") addresses which have information of interest to the user. The search engines do not take into account other information, other than subject matter, which may be used in retrieving information.

Current search engines do not take into account characteristics of the user that could better customize retrieval and evaluation of information for the user. These may include personal vocabulary, sentence characteristic preferences, descriptor preferences, depth of interest in given topics and user-related knowledge. If a user enters a subject key word or subject matter into a search engine, many retrieved URL addresses may be irrelevant to a particular user. For example, a particular user may be a nine-year-old child wanting to learn about butterflies who has distinguishing characteristics from another user such as a post-graduate entomology student. Both users are interested in the same subject, but each desires different levels of sophistication in information retrieved.

Users typically have a variation of personal characteristics which define who they are and what they enjoy. These personal characteristics include general interests and identity information, attitude and aptitude information, personal heroes and media comprehension. Characteristics regarding a specific user are not used by current search engines in retrieving prospective information.

Further, current search engines only examine text data and ignore other media types such as sound and video files that contain voice information. Current search engines do not convert the voice information into text and evaluate the converted sound file. This is a significant shortcoming since a much of the information on the internet is not text data. Users typically find sound and video presentations popular, easy and efficient ways of interacting and obtaining information and, in most cases, probably prefer this media over text.

The current search engines do not collect information generated by the user's selections of retrieved media files to evaluate retrieved media files in the current session as well as later sessions. Every time a user looks through a list of media files and/or a brief description of media files, what the user selects and doesn't select can be used to determine the user's interests. Every time a user interacts with a media file, by choosing to read it, print it, or skip it, the user is identifying a level of interest in the particular media file.

Users search for information on the internet for various reasons. These reasons effect the type of information in which they are interested. For example, a Ph.D. student may search for information used in his thesis and also search for recreation. There is presently no way to capture these personal motivations and use them in searches for information on the internet.

Finally, current search engines do not generally mark up media files such that a user can efficiently locate information of interest.

Therefore, it is desirable to provide an apparatus, article of manufacture and method for retrieving and evaluating information on the internet using user-specific characteristics. These characteristics may include general interest information, identity information, attitude and aptitude information, personal heroes, media compatibility and media comprehension ability. The apparatus, article of manufacture and method should also take into account user selections and interest in specific information in retrieving further information. Text, sound and video files should all be evaluated based on user characteristics. Also, the reason or motivation for searching the internet should be used in searching for information. The invention should also mark points of interest in media files such that a user can quickly locate information of interest in lengthy media files.

SUMMARY OF THE INVENTION

According to an aspect of the present invention, a data processing apparatus for obtaining information from a computer network, such as the internet, is presented. The apparatus comprises: (a) a display for displaying data to a user; (b) input means for supplying input data in response to a user's input; (c) memory, coupled to the display and input means, for storing a Personal Feedback browser and a Personal Profile database; and, (d) a processor, coupled to the display, the input means and memory, for controlling the memory, input means, and the display in response to the stored Personal Feedback browser and the Personal Profile database, wherein the Personal Feedback browser provides a media file to the display based on the Personal Profile database.

According to another aspect of the present invention, the Personal Feedback browser includes a profile builder software program for obtaining and storing personal profile data into the Personal Profile database.

According to another aspect of the present invention, the Personal Feedback browser includes a media evaluation software program for evaluating a media file obtained from the computer network based upon personal profile data in the Personal Profile database.

According to another aspect of the present invention, the media evaluation software program includes a sound file to text file software program for translating a sound file to a text file.

According to another aspect of the present invention, the Personal Feedback browser includes an adaptive software program for modifying the Personal Profile database in response to a user's selection of the media file.

According to another aspect of the present invention, the Personal Feedback browser includes an adaptive software program for modifying the Personal Profile database in response to a user's absorption of the media file.

According to another aspect of the present invention, the personal feedback browser includes a mark-up software program for highlighting sections of a media file in response to a plurality of key words assigned sound values in the media file.

According to another aspect of the present invention, the data processing apparatus further comprises an eye-tracking device coupled to the processor for adjusting a media progression rate value.

According to another aspect of the present invention, the profile builder software program includes a software program for providing a Profile Object and a Self Object, wherein the Profile Object's distance from the Self Object is adjusted by a user to adjust impact on rating media files. Further, the Profile Object is either an Identity/Interest Profile Object, Hero Profile Object, Descriptor Profile Object and/or Attitude/Aptitude Profile Object.

According to another aspect of the present invention, an article of manufacture, including computer readable medium having computer readable program code means embodied therein for obtaining a media file from the internet, is provided. The article of manufacture comprises: (a) computer-readable program code means for building a Personal Profile database responsive to user input; (b) computer-readable program code means for evaluating a media file obtained from the internet based upon the Personal Profile database; (c) computer-readable program code means for adjusting the Personal Profile database responsive to a user selection of the media file; (d) computer-readable program code means for adjusting the Personal Profile database in response to a user's absorption of the media file.

According to still another aspect of the present invention, a method for obtaining a media file from the internet comprises the steps of: (a) building a Personal Profile database containing user-specific information; (b) retrieving a plurality of media files from the internet based upon a subject key word; (c) evaluating the plurality of media files obtained from the internet responsive to the Personal Profile database; (d) adjusting the user's Personal Profile database in response to a selection of a media file from the plurality of media files obtained from the internet; and, (e) adjusting the Personal Profile database based on a user's absorption of the media file obtained from the internet.

BRIEF DESCRIPTION OF THE DRAWINGS

The accompanying drawings, referred to herein and constituting a part hereof, illustrate principles and embodiments of the present invention and together with the description serve to explain the principle of the invention in which:

FIG. 10a Illustrates the Attitude/Aptitude Evaluation method used in Profile Builder module 211 shown in FIG. 3a according to the present invention.

FIG. 10b illustrates an Attitude/Aptitude Evaluation sample personality question according to the present invention.

FIG. 15a Illustrates a Search Results screen having Content to User Fitness Indicators according to the present invention.

DETAILED DESCRIPTION OF THE INVENTION

I. Data Processing Apparatus Architecture

Figure 1:
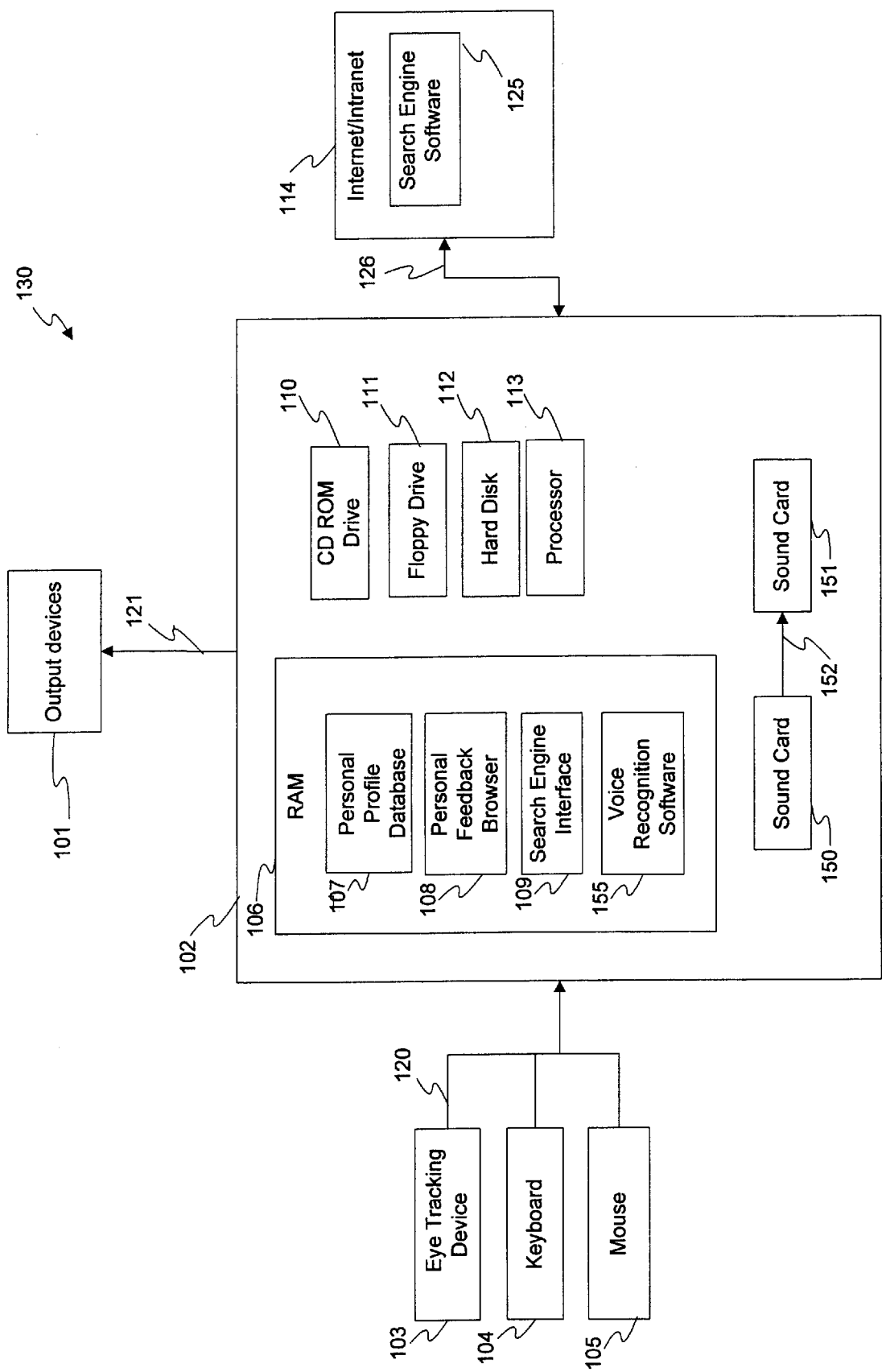
FIG. 1 Illustrates an apparatus having a Personal Feedback browser according to the present invention.

FIG. 1 illustrates a data processing apparatus 130 having a Personal Feedback browser 108 according to the present invention. In an embodiment, data processing apparatus 130 may be a computer 102 having random access memory ("RAM") 106, compact disk read-only memory ("CD-ROM") drive 110, floppy drive 111, hard disk 112, and processor 113.

In alternate embodiments, data process apparatus 130 may be a "network computer" and/or "web-enabled television" available from WebTV Networks, Inc., Palo Alto, Calif. In another embodiment, data processing apparatus 130 may be a web-enabled telephone, for example, a model P100-A/B available from Philips Home Services, Inc., 1764A New Durham Road, South Plainfield, N.J. 07080.

Personal Profile database 107, Personal Feedback browser 108, Search Engine interface 109 and voice recognition software 155 are stored in RAM 106. In alternate embodiments, Personal Profile database 107, Personal Feedback browser 108, Search Engine interface 109 and voice recognition software 155 may be embodied in a software program stored on a computer readable medium, such as a magnetic or optical disk. Personal Feedback browser 108 and search engine interface 109/search engine software 125 are used to obtain information from internet 114 based on user characteristics and selections. User characteristics may include 1) interests/identity, 2) attitude/aptitude characteristics, 3) personality characteristics, 4) media compatibility criteria, 5) media comprehension ability.

Computer 102 receives input from Electric Eye Tracking Device 103, keyboard 104, and mouse 105 on line 120. Electronic Eye Tracking device 103 and related software can be obtained from Applied-Science Laboratories, Bedford, Mass. or ISCAN Inc., Burlington, Mass.

In an embodiment, Applied Science Laboratories' Eye Tracking Device Series 4000 is a table mounted optics unit that is attached to computer 102. A RS232 connector cable connects the series 4000 device to an ISA board that is mounted in computer 102. In this embodiment, computer 102 uses a Microsoft Windows NT operating system with the Series 4000 eye tracking software running in a DOS shell.

In an embodiment Computer 102 has two sound cards 150 and 151. These sound cards are connected by line 152 where sound card 150's audio output is connected to sound card's 151 audio input. In an embodiment, sound cards 150 and 151 are Creative Labs Sound Blaster 16 sound cards which may be obtained from Creative Labs Incorporated, 1901 McCarthy Blvd, Milpitas, Calif. 95035. Sound card drivers are also loaded into RAM 106.

In an embodiment, RAM 106 also contains Microsoft Windows 95 operating system.

Computer 102 generates output on line 121. Output devices 101 may include a monitor, speakers and/or virtual reality hardware. Computer 102 is also connected to a computer network, such as internet/intranet 114 by line 126. Computer 102 accesses a search engine 125 on line 126 via Search Engine interface software 109. In other embodiments, computer 102 may access internet/intranet by way of wireless communication. In other embodiments, Personal Feedback browser 108 may be used to obtain information from a compact disk in CD-ROM drive 110.

II. Personal Feedback Browser and Interfaces

Figure 2:
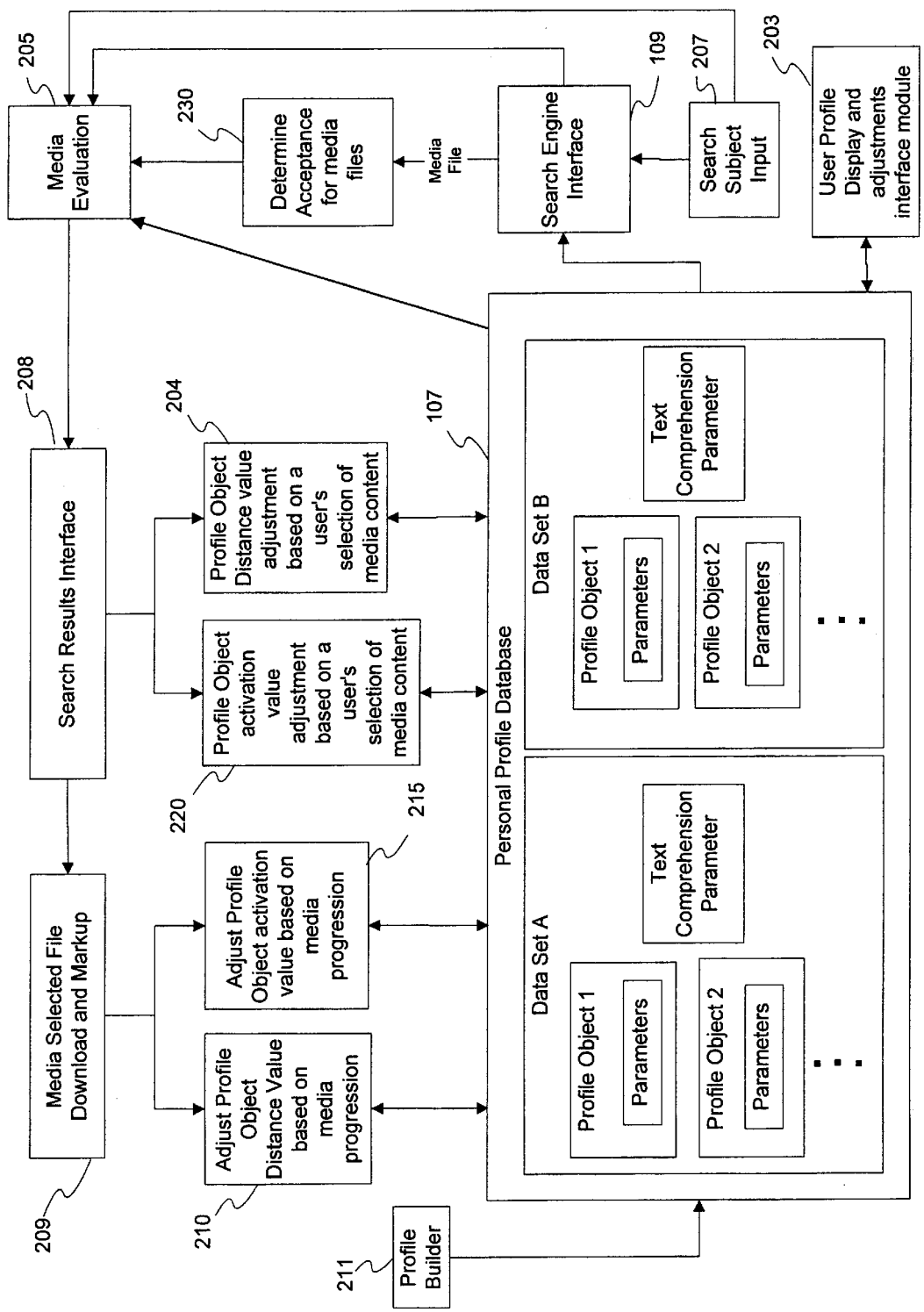
FIG. 2 Illustrates a block diagram of a Personal Feedback browser according to the present invention.

FIG. 2 illustrates a Personal Feedback browser 108 shown in FIG. 1, along with Personal Profile database 107 and Search Engine interface 109 according to the present invention. A brief description of the software modules comprising Personal Feedback browser 108 and associated interfaces is discussed below. A detailed description of each software module, and in particular, the methods describing the software modules, is described in greater detail below.

A. Personal Profile Database

Figure 6A:
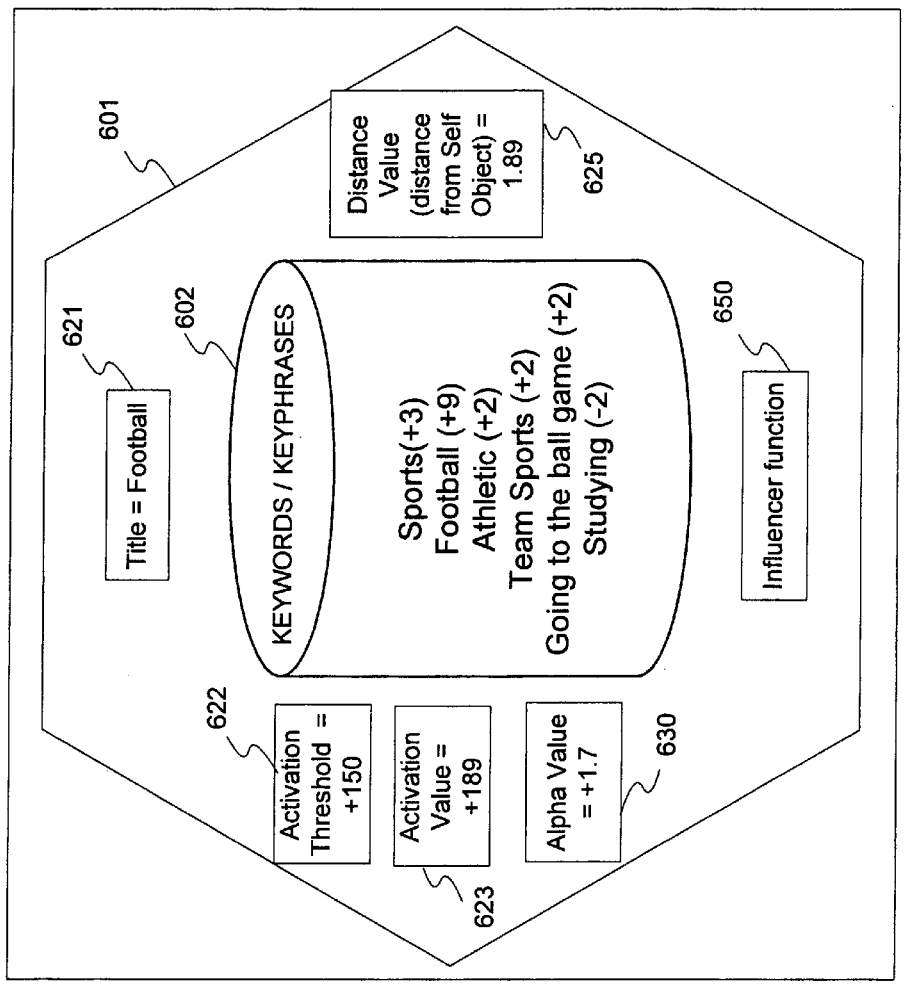
FIG. 6a Illustrates a Profile Object according to the present invention.

A fundamental component used with the Personal Feedback browser 108 are Profile Objects. Profile Objects, as illustrated in FIG. 6a, contain bundles of key words and key phrases which have corresponding signed numeric values or weights.

In an embodiment, Profile Object contains at least one key word or ia key phrase with a corresponding signed weight. For example, "sports" has a positive 3 weight value in the Profile Object illustrated in FIG. 6a. Typically there are many key words and key phrases with corresponding signed weights contained in a particular Profile Object. The bundle of key words and key phrases may include positive weighted key words/key phrases, typically for synonyms. Negative weighted key words/key phrases, typically for antonyms, identify a particular identity, trait, interest or descriptive term that the Profile Object represents. These key words and key phrases have corresponding numerical values which are used to rate retrieved media files in terms of the user's interest.

In an embodiment positive weighted key words/key phrases are not limited to synonyms and negative weighted key words/key phrases are not limited to antonyms.

In an embodiment, key words in Profile Objects that are present in media file being analyzed are treated as equivalents to other key words located in a thesaurus database.

In an embodiment, a Profile Object's key words/key phrases and their corresponding signed weights cannot be changed by a user.

In another embodiment, a Profile Object's key words/key phrases and their corresponding signed weights may be changed by a user.

Personal Profile database 107, as illustrated in FIG. 2, stores information regarding a user's personal characteristics that are utilized by various software modules to evaluate a retrieved media file. Specifically, Personal Profile database 107 includes Profile Object's parameters and a text comprehension parameter. Profile Object Parameters (for example, a Distance value, Activation value, and Alpha value which are described in detail below) as well as a Text Comprehension Parameter (for example, Flesch-Reading Ease and/or average characters per word) are stored in Personal Profile database 107.

In an embodiment, more than one Text Comprehension Parameter may be stored in Personal Profile database 107 for use in rating media files.

Each Profile Object has a Distance value defined by the relative distance from the active Profile Object to a "Self Object." A Self Object signifies the identity of the user, where ideas, interests, and values represented by Profile Objects surround the user. In this way, a user builds a representation of himself or herself. The effect key word/key phrases have in rating a media file is based on their corresponding numeric weight values and the Distance value which is representative of the relative distance of the Profile Object from a Self Object. The closer a Profile Object is to a Self Object, the more effect each of the key words and key phrases contained in said Profile Object have in rating media files. The Distance value is adjusted by the user's choices in accessing media files and interaction with media files. In an embodiment, the Distance value is never less than 0.

In an embodiment, if the Distance value changes sign, all key words'/key phrases' weight values are multiplied by (−1) and the absolute value of the distance is used for the Distance value of the Profile Object.

Profile Objects are either active or inactive. Only active Profile Objects are used to rate media files. Each Profile Object has an Activation value 623 and a Activation Threshold value 622, as seen in FIG. 6a. The Activation value is adjusted by the user's choices in accessing media files and interaction with media files. If a Profile Object's Activation value is greater than its Activation Threshold value, then the Profile Object is active. If the Profile Object's Activation value is below or equal to the Profile Object's Activation Threshold value, then the Profile Object is not active.

A text comprehension parameter associated with a specific user is used in evaluating whether a specific media file is suitable for a user. For example, a user may have an associated Flesch-Reading Ease score used to evaluate whether a media file contains suitable text which matches the user's sophistication.

In an embodiment there are several data sets of Profile Objects and text comprehension parameters for a particular user. The user can select which data set is used to evaluate media files. Having more than one data set allows the user to evaluate media files based on the motivation of the information search. For example, a user can have one data set that is used for searching and evaluating information for his or her work and another data set for searching and evaluating information for entertainment.

In an embodiment, a single Personal Profile database 107 data set is used.

B. Profile Builder

Figure 3A:
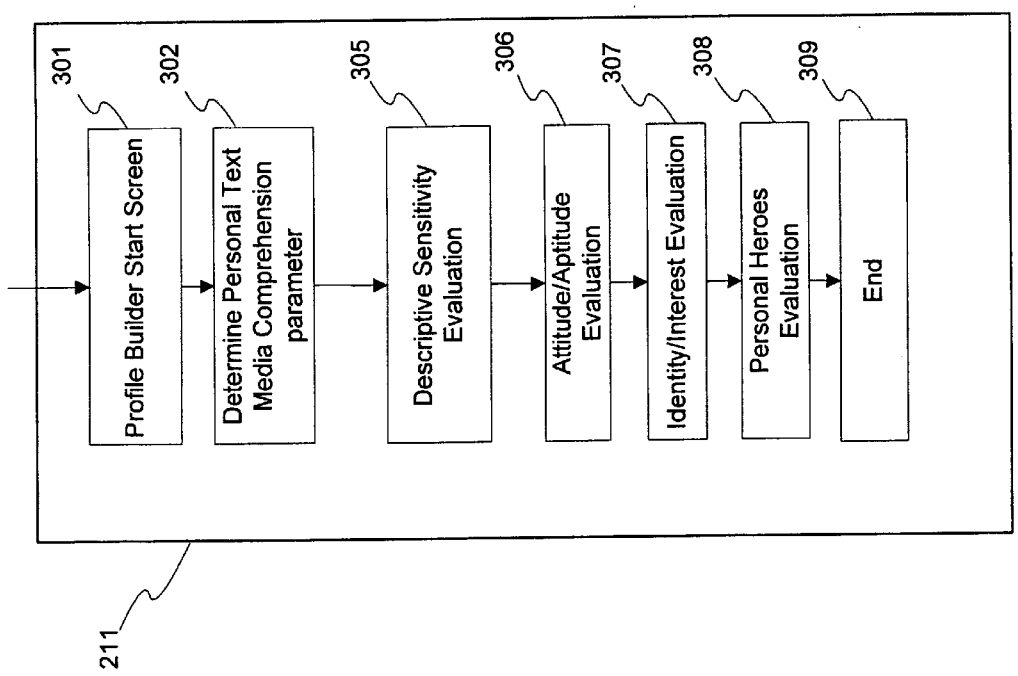
FIG. 3a Illustrates a Profile Builder module according to the present invention.

Profile Builder module 211 includes software modules for determining Profile Object Activation values that correspond to whether or not Profile Objects are active, as well as Profile Object Distance values that correspond to the impact key words and key phrases contained in Profile Objects have on rating media files. This module also determines the text comprehension parameter which is used in determining whether a media file is appropriate for a user. Profile Builder module 211, as illustrated in FIG. 2 and 3a, subjects a user to a series of questions and interactive exercises that build a user's Personal Profile database 107 which is used in evaluating suitability of a retrieved media file. These Profile Objects and their corresponding parameters and a text comprehension parameter are then stored in a data set in Personal Profile database 107.

In an embodiment, several data sets containing Profile Objects with their corresponding parameters and the text comprehension parameter can be obtained and/or adjusted with the Profile Builder for a particular user.

Figure 7A:
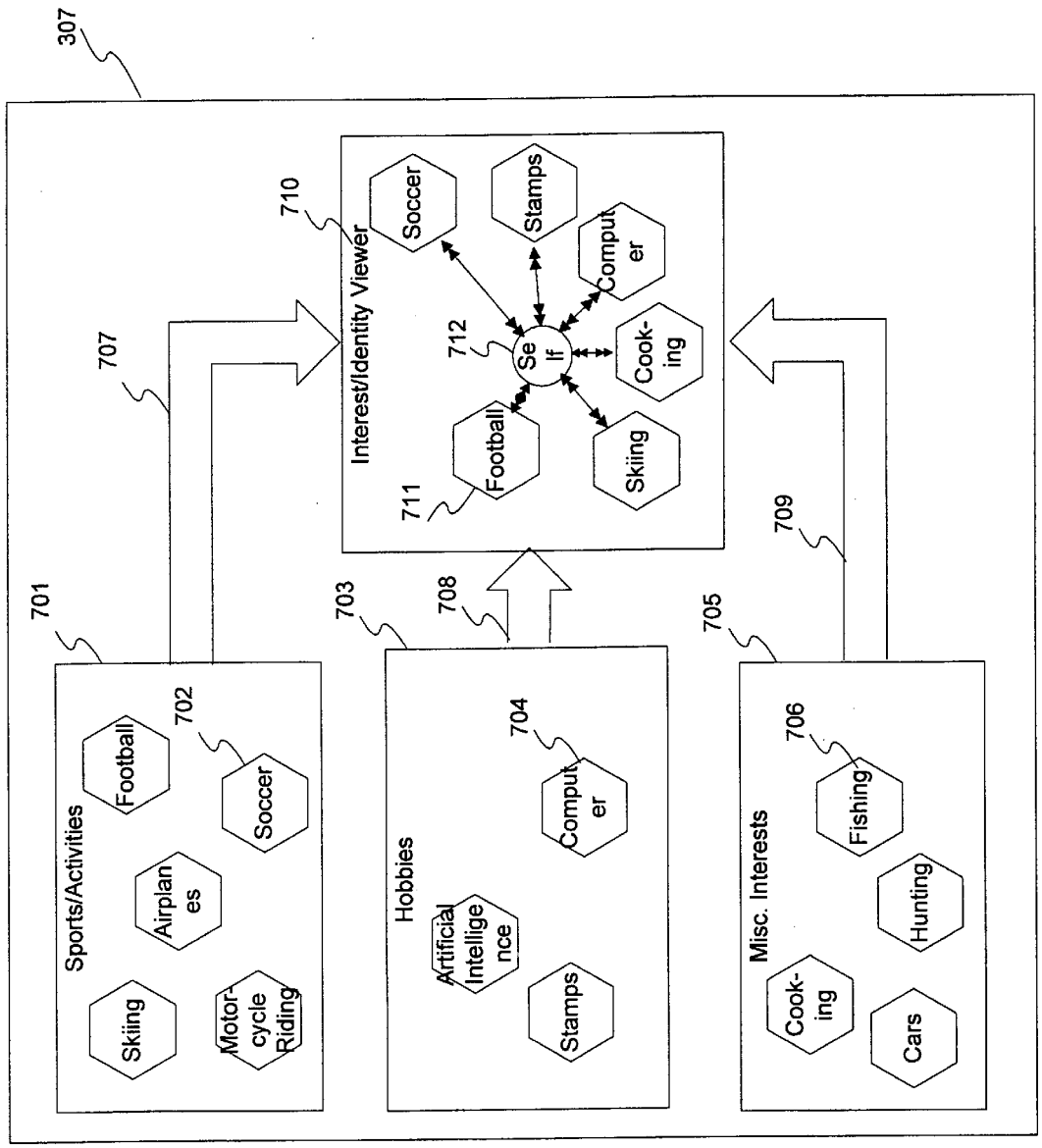
FIG. 7a Illustrates the Identity/Interest Evaluation method used in the Profile Builder module 211 shown in FIG. 3a according to the present invention.
Figure 8A:
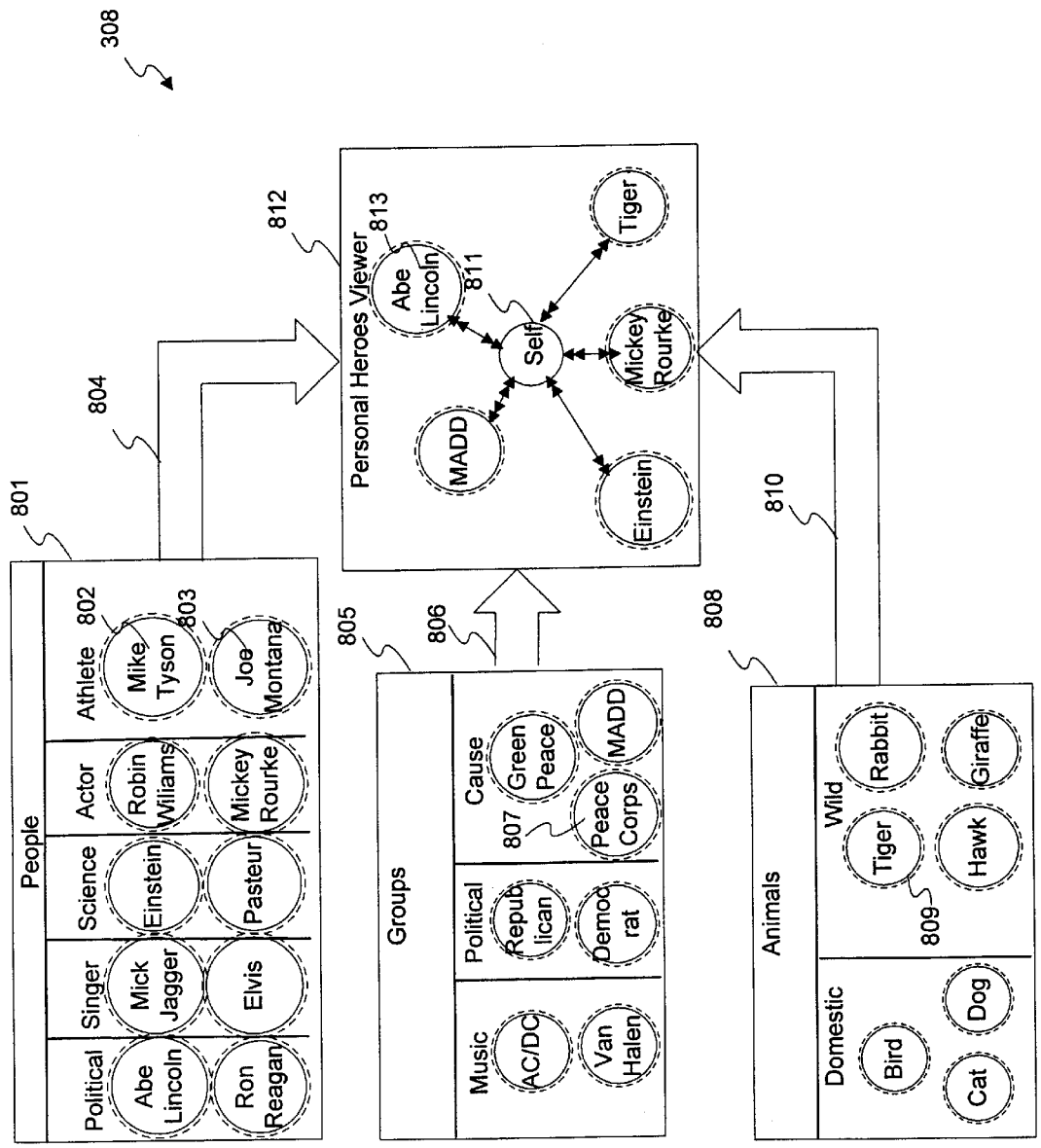
FIG. 8a Illustrates the Personal Heroes Evaluation method used in the Profile Builder module 211 shown in FIG. 3a according to the present invention.

FIG. 3a illustrates Profile Builder module 211 according to the present invention. Logic blocks 302–308 are further illustrated in FIGS. 7–11 and described below. Logic block 301 generates a profile building session prompt screen for a user. Control is then transferred to logic block 302 which determines the text media comprehension parameter for the user, as illustrated in detail in FIG. 11. Control is then transferred to logic block 305 where an interactive descriptor evaluation locates, activates (by increasing Activation value to a predetermined amount above the Activation Threshold value), and sets the Distance value for Profile Objects that contain key words and key phrases that will be used in rating descriptive word compatibility, as illustrated in FIG. 9a. Control is then transferred to logic block 306 where an interactive attitude/aptitude evaluation locates, activates (by increasing Activation value to a predetermined amount above the Activation Threshold value), and sets the Distance value for Profile Objects that contain key words and key phrases that will be used in rating media files for the user, as illustrated in FIGS. 10a–c. Control is then transferred to logic block 307 which locates, activates (by increasing Activation value to a predetermined amount above the Activation Threshold value), and sets the Distance value for Profile Objects that contain key words and key phrases that will be used in rating media files for the user using an interactive Identity/Interest evaluation, as illustrated in FIG. 7a. Control is then transferred to logic block 308 where a user interactive hero evaluation locates, activates (by increasing Activation value to a predetermined amount above the Activation Threshold value), and sets the Distance value for Profile Objects that contain key words and key phrases that will be used in rating media files for the user using a personal hero evaluation, as illustrated in FIG. 8a. Control is then transferred to logic block 309 where the Personal Profile Builder module ends. It should be understood that in alternate embodiments, various combinations of logic blocks 302–308 may be used or omitted.

C. User Profile Screen Interface

Figure 4A:
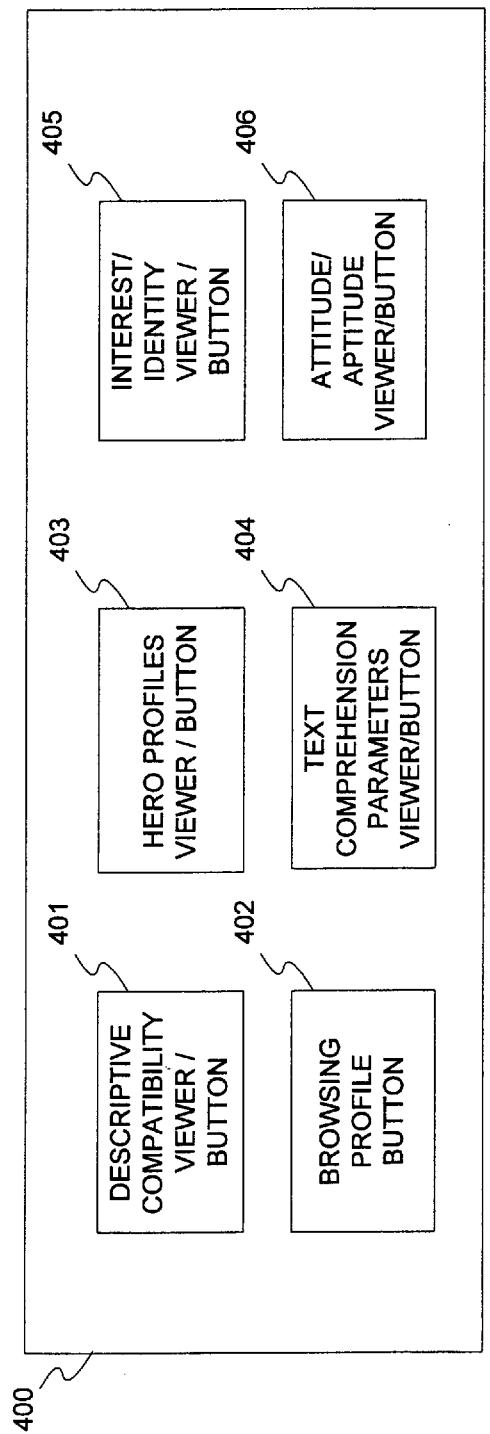
FIG. 4a Illustrates a User Profile Display and Adjustment module screen according to the present invention.

FIG. 4a illustrates a display screen generated by User Profile Display and Adjustment module 203. Parameters regarding active Profile Objects which are used in rating media files for the user as well as parameter values that determine media comprehension ability for a specified user may be accessed by control panel 400. The user may interact with the control panel 400 to manipulate a Distance value of any active Profile Object and thereby change the effect of key words and key phrases contained in a selected active Profile Object has in rating media files.

In another embodiment module 203 may display Profile Object values in a tabular spreadsheet format wherein the properties and values of Profile Objects can be viewed and adjusted.

In an embodiment, if a user double clicks one of the control panel 400 fields, for example, button 401, the user may edit the values of a Profile Object or add and delete key words/key phrases and/or change key word/key phrase weights, as well as change the following Profile Object values: Distance value, Activation value, and Activation Threshold value.

In an embodiment, a user can create his or her own Profile Objects.

Descriptive Compatibility viewer/button 401 allows a user to access and change Distance values in Profile Objects containing positive weighted descriptive key words/key phrases associated with a particular user's vernacular and negative weighted descriptive key words/key phrases not associated with a particular user's vernacular.

Browsing Profile button 402 allows a user to select from several different Personal Profile data sets that represent the user. This is valuable because a user may need to have different media evaluation sets to satisfy different search needs: for example, different search/evaluation criteria are necessary if someone is searching for work versus for pleasure.

Hero Profiles viewer/button 403 allows a user to access and change the Distance value in Profile Objects associated with popular stereotypes or heroes.

Text Comprehension Parameter viewer/button 404 allows a user to access and change a Text Comprehension Parameter value associated with a particular user.

Identity/Interest viewer/button 405 allows a user to access and change the Distance value in Profile Objects associated with a particular user's identity and/or interest.

Attitude/Aptitude button 406 allows a user to access and change the Distance value in Profile Objects associated with a particular user's attitude and/or aptitude.

D. Search Engine Interface

Search Engine interface 109 accesses a Search Engine 125 on Internet/Intranet 114 in order to retrieve media files. Search Engine interface 109/Search Engine 125 retrieves media files based on user input, as illustrated by logic block 207. Retrieved media files are then transferred to Media Acceptance module 230 where it is determined which media files are within the user's comprehension level. Accepted files are then transferred to Media Evaluation module 205 which also receives the Search subject input data from module 207. In an embodiment, media files from an internet web page or an internet news groups may be obtained from internet/intranet 114.

In an alternate embodiment, media files may be retrieved from a CD-ROM 110.

Figure 4B:
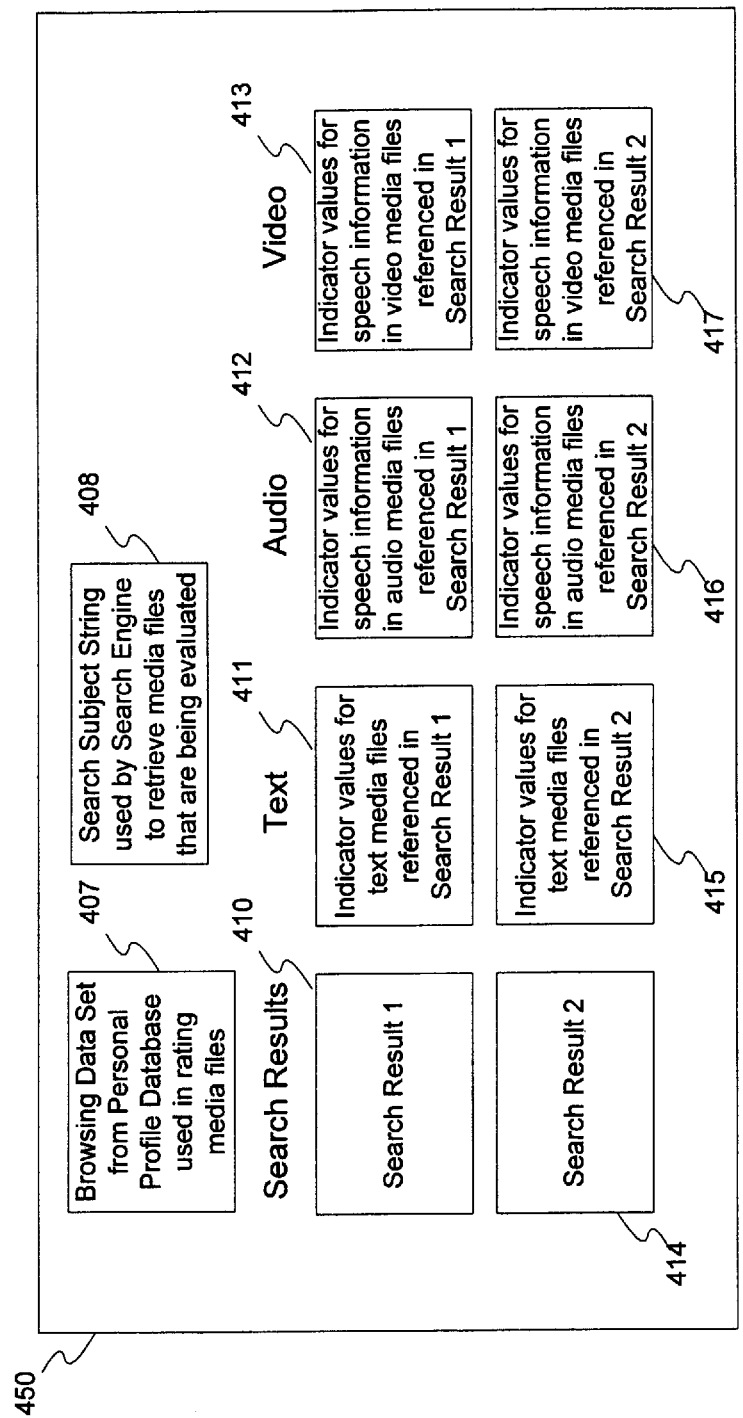
FIG. 4b Illustrates a Search Results Interface screen according to the present invention.

Media Evaluation module 205 transfers rating values and file information to Search Results Interface 208 which generates a graphic display, such as display 450 in FIG. 4b, showing the media files located and also providing indicators that illustrate suitability of the media file based on the user's Personal Profile database 107. Search Engine interface 109 also transfers subject match rating of media files to media evaluation 205, which is provided by Search Engine software 125. Display 450 shows various media types including text files, audio files and video files. Indicator value Blocks in fields 411–413 contain index values that indicate the suitability of a particular media file based on a user's data set in Personal Profile database 107 and subject match rating.

Browsing Profile Field 407 indicates which data set is being used in Personal Profile database 107 to evaluate media files. Inputted File Indicator field 408 illustrates the file subject criteria used by Search Engine 125 to retrieve the media files that are presented and evaluated in the Search Results display 450. In an embodiment, search results are ranked in order of media acceptance ratings described below.

Search result descriptions 410 and 414 indicate a textual synopsis of the type and location of the media file on the internet that is provided by Search Engine interface 109. For example, description 410 may include a URL address and text synopsis of a media file.

Index Value Indicator fields 411, 412 and 413 contain index values generated by Media Evaluation module 205. Index Value Indicators, except for Subject indicator as explained below, are generated from a user data set located in Personal Profile database 107 which is selected in logic block 407 and are used to display suitability ratings of media files for a particular user as described below in relation to FIG. 15.

Index value Indicator field 411 contains index values for text media files which illustrate values of fitness of content to the user of text information contained in a media file identified in field 410.

Index Value Indicator field 412 contains index values for sound media which illustrate values of fitness of content to the user of speech information contained in a media file identified in field 410.

Index Value Indicator field 413 contains file index values for video media which illustrate values of fitness of content to the user of speech information contained in a media file identified in field 410.

Likewise, index Value Indicators 415, 416, and 417 contain media indicator values of fitness of content relative to the user of a media file identified in field 414.

E. Media Evaluation

Figure 13:
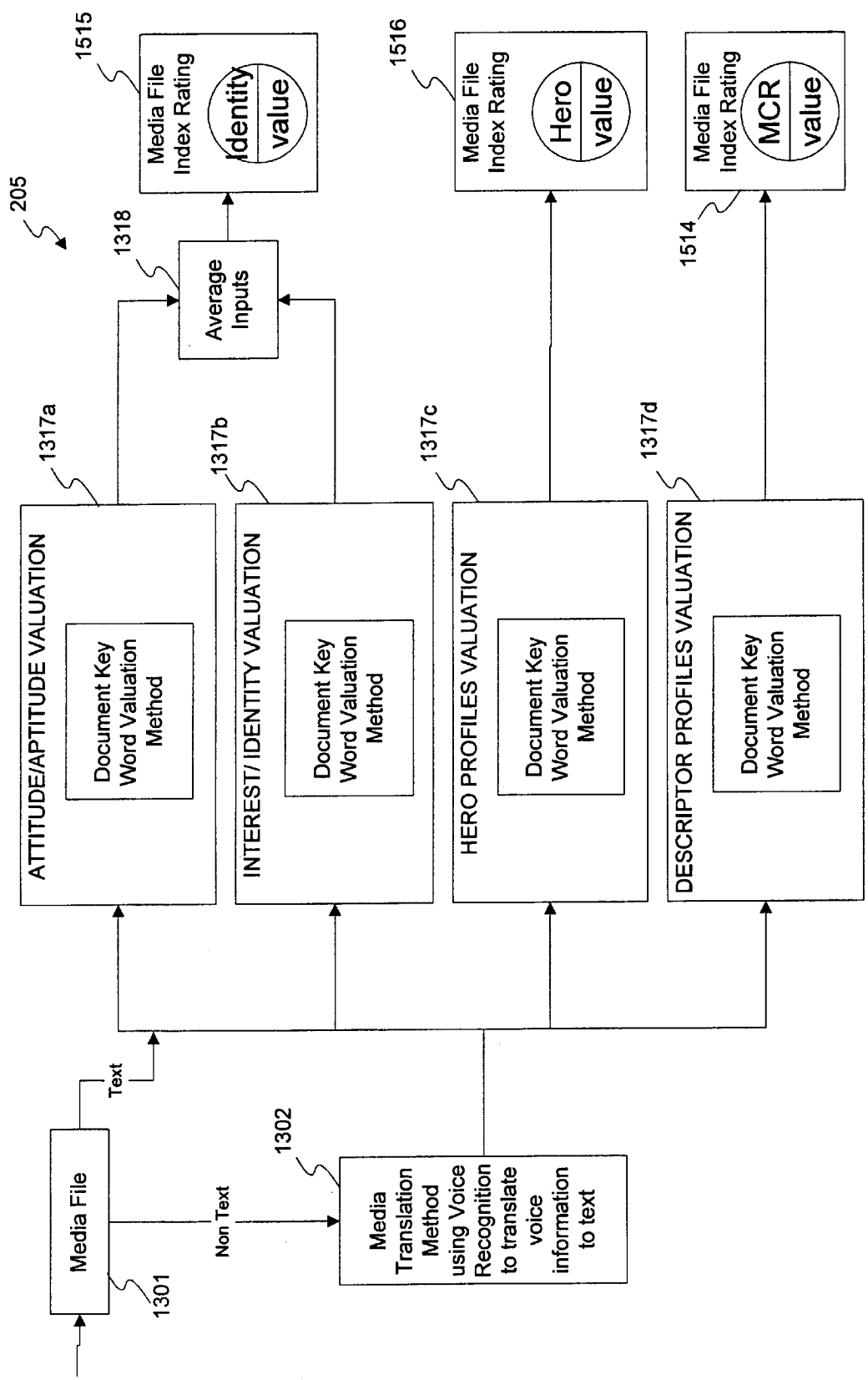
FIG. 13 illustrates the Media Evaluation module 205 shown in FIG. 2 according to the present invention.

Personal Feedback browser includes a Media Evaluation module 205, as illustrated in FIG. 13, which examines the content of a media file in response to Personal Profile database 107 data set. The examination includes rating methods using Profile Objects containing key words and/or key phrases. The evaluation module creates a variety of indexes that assist a user in determining interest in the content of a media file.

Media Evaluation module 205 in FIG. 2 receives subject matching rating from Search Engine 125 through Search Engine interface 109 regarding located media files. Media Evaluation module also extracts information from a media file retrieved from Search Engine interface 109 and analyzes files responsive to active Profile Object key words/key phrases and corresponding Influence values (described below) as well as a text comprehension parameter in Personal Profile database 107. Media Evaluation module 205 logs media files received for evaluation so that the same media file is never evaluated more than once during the same session. Media Evaluation 205 then sends evaluation results to Search Results interface 208.

In an embodiment Personal Feedback browser 108 does not require input from Search Engine 125. For example, Media Evaluation module 205 can evaluate all files at a URL address specified by a user and therefore not require input from Search Engine 125. In this embodiment, search engine subject words and subject index rating values will not be received from Search Engine 125 and therefore subject index rating value 1513 and Field 1550 of FIG. 15 is not used.

In an embodiment, Media Evaluation module 205 evaluates all files at a web address located by search Engine 125.

Search Results interface 208 creates a search result image to be displayed on a display which includes search results and index values which illustrate ratings of a media file based on a user's Personal Profile database, including Profile Object parameters and a text comprehension parameter. The types of indexes and how they are created are described below. From the Search Results interface 208, the user then may select a media file to be viewed or downloaded.

F. Profile Object Distance Value Adjustment Based on User Selection

Adjusting the Distance value of certain Profile Objects based on user selection module 204 adjusts Distance values of Profile Objects in Personal Profile database 107 data set based upon a user's media selections.

The user's selection of information, in particular a URL address and/or descriptions of a media file, represents a particular user's interests and may be used in further searching by changing the Profile Object's Distance value as explained below.

Figures 3B, 3C:
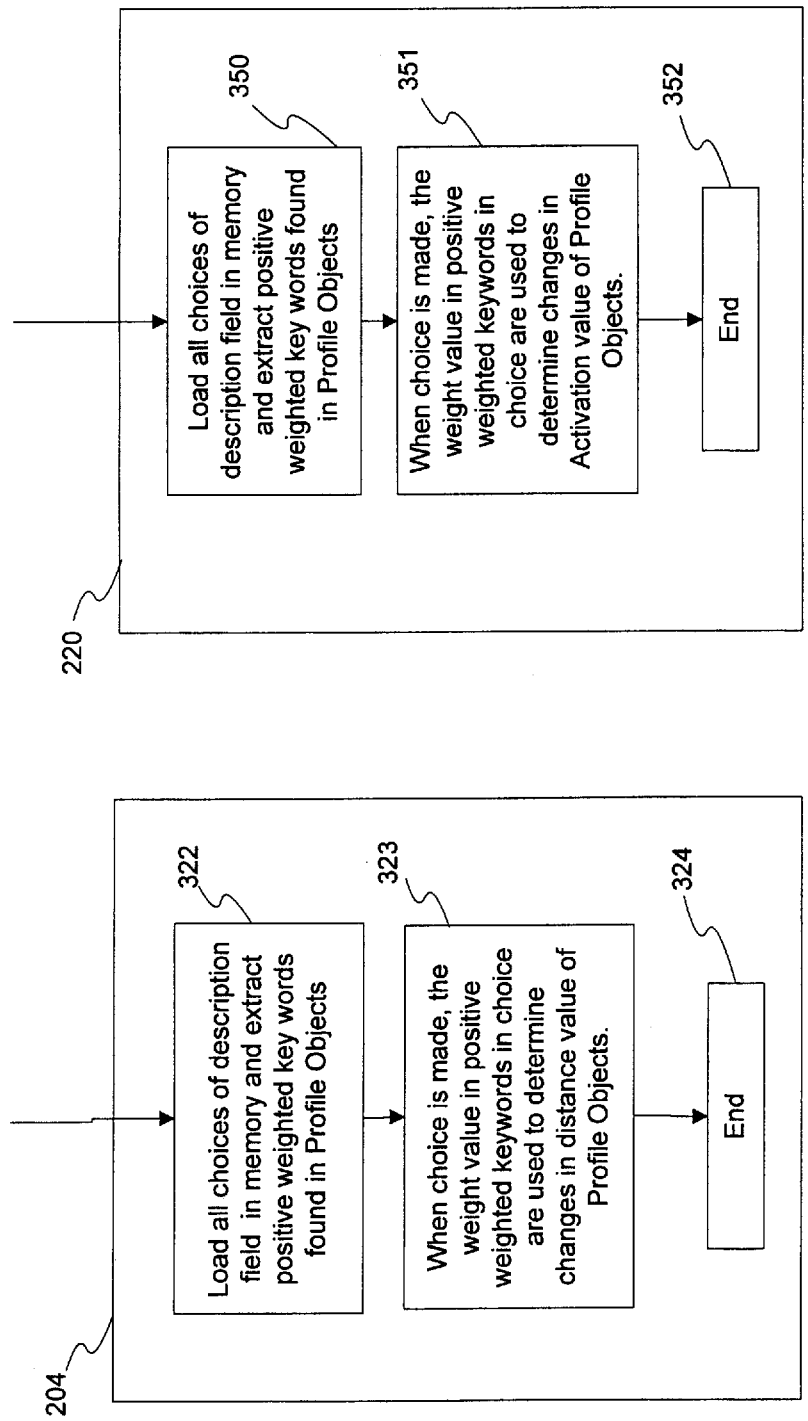
FIG. 3b Illustrates a Profile Object Distance Value Adjustment Based on User's Selection of Media Content module according to the present invention.
FIG. 3c Illustrates a Profile Object Activation Value Adjustment Based on User's Selection of Media Content module according to the present invention.

FIG. 3b Illustrates Profile Object Distance Value Adjustment Based on User Selection Module 204. Logic block 322 extracts and loads all positive weighted key words and key phrases in Profile Objects, as illustrated in FIG. 15. Control is then transferred to logic block 323 where key words in search results field 1503 are compared to positive weighted key words in Profile Objects in a Personal Profile database 107 data set. If key words with positive weights are found in a user's selection, such as Search Results field 1503, corresponding to key words in a particular Profile Object, then the Distance value of the Profile Object is adjusted in Personal Profile database 107 data set. Control is then transferred to logic block 324 where the function ends.

G. Profile Object Activation Value Adjustment Based on User Selection

Adjusting Activation values for certain Profile Objects Based on user Selection Module 220, as illustrated in FIG. 3c, adjusts the Activation values of certain Profile Objects in a Personal Profile database 107 data set based upon user selections.

The user's selection of information, in particular descriptions of media files and/or descriptions of internet pages, represent a particular user's interests and may be used in further searching and media file evaluation.

FIG. 3c illustrates the Profile Object Activation Value Adjustment Based on User's Selection of Media Content module 220. Logic block 350 loads the description of all of the media file choices into memory and extracts positive weighted key words and key phrases that are present in Profile Objects. Key words in a media file choice description, such as Search Results field 1503, are compared to positive weighted key words/key phrases in Personal Profile database 107 data set in logic block 351. If positive weighted key words/key phrases are found in a user's selection corresponding to key words in a Profile Object, then the Activation value of said Profile Object is adjusted in a Personal Profile database 107 data set. Control is then transferred to logic block 352 where function ends.

In an embodiment, after each media selection, all Profile Object Activation values are decreased and Distance values are increased to prevent a Profile Object from having undue impact on media evaluation. Profile Object Activation Value Adjustment Based on User's Selection of Media Content module 220 can only increase a Profile Object's Activation value. Profile Object Distance Value Adjustment Based on User's Selection of Media Content module 204 can only decrease a Profile Object's Distance value. Therefore, by automatically countering these changes by a small amount after each choice, undue impact can be prevented.

In an embodiment, Profile Object parameter values have maximum and minimum values.

H. Profile Object Distance Value Adjustment Based on Media Progression

Figure 3E:
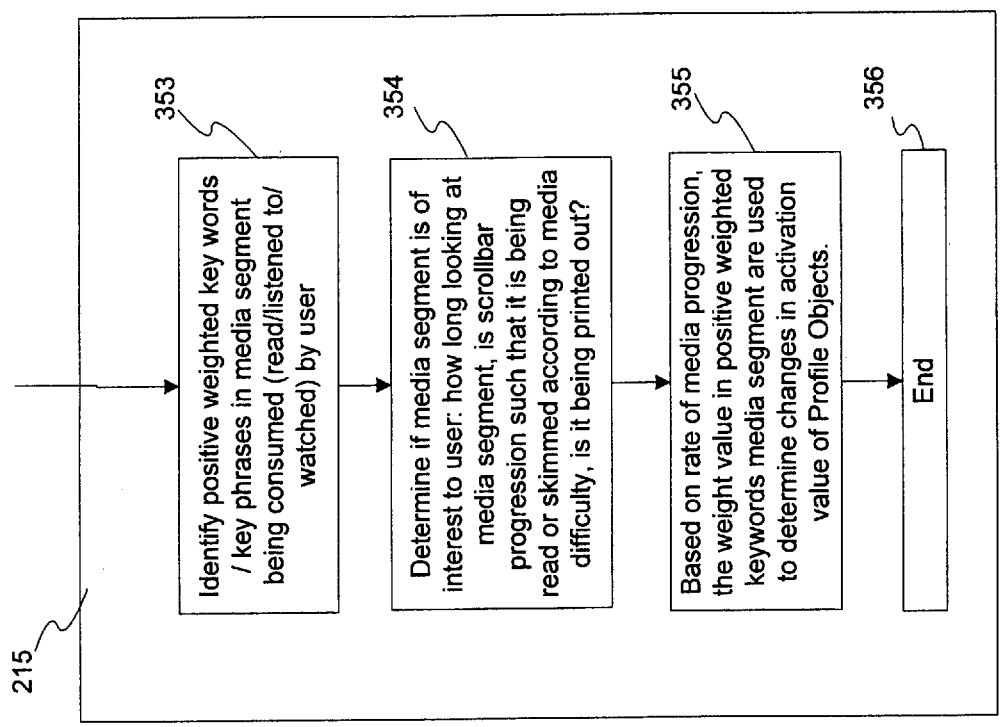
FIG. 3e illustrates a Profile Object Activation Value Adjustment Based on Rate of Media Progression module according to the present invention.
Figure 3D:
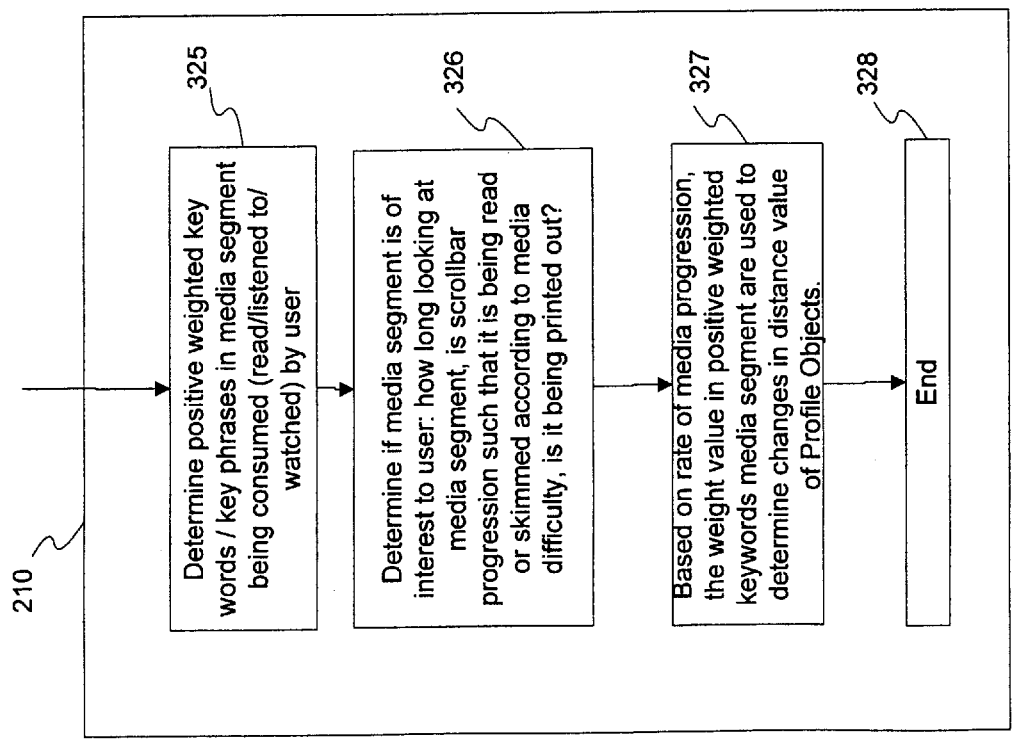
FIG. 3d Illustrates a Profile Object Distance Value Adjustment Based on Rate of Media Progression module according to the present invention.

Changing the Distance value of certain Profile Objects Based on Media Progression module 210, as illustrated in FIG. 3d, adjusts the Distance value of certain Profile Objects in Personal Profile database 107 based on a user's rate of progression through a media file.

When a user is examining a media file, the rate of progression through the media file may indicate interest in the particular media file. For example, if a user skims a section of the media file, interest is most likely not as high as if the user pays close attention to particular section and reads more slowly.

FIG. 3d illustrates Profile Object Distance Value Adjustment Based on Media Progression module 210 shown in FIG. 2. The Profile Object Distance value determines the impact a Profile Object has in ia rating media files. This value can be adjusted based on a user's rate of media progression. Logic block 325 identifies positive weighted key words/key phrases in the media file being viewed by a user. Control is then transferred to logic block 326 where it is determined if the media file is of interest to the user, for example, by examining how long the user is looking at the section of the media file segment, if the sound file/video file is being accessed repeatedly, how fast is a scroll bar progressing on a text file segment, or is the media file segment printed, saved or listened to. Then control is transferred to logic block 327 where the effect of Profile Objects containing positive weighted key words and key phrases found in a media file segment is changed by adjusting the Distance value. Control is then transferred to logic block 328 where the module ends. This is illustrated in more detail in FIG. 17 and FIG. 18.

I. Profile Objects Activation Value Adjustment Based on Media Progression

Profile Object Activation Value Adjustment Based on Media Progression module 215, shown in FIG. 3e and FIG. 2, adjusts the activation values of certain Profile Objects in Personal Profile database 107 data set based on a user's rate of progression of a selected media file segment.

Logic block 215 receives a media file segment from logic block 209 that makes adjustments to the activation value of certain Profile Objects in a Personal Profile database 107 data set. If the activation status value is above the activation threshold of a Profile Object, then the Profile Object is active. If the activation status value is at or below the activation threshold of a particular Profile Object, then the Profile Object is inactive.

The user's rate of progression through the media file segment may indicate interest in the particular media file segment and can be used to change the activation value of a Profile Object which in turn determines whether or not a particular Profile Object is used in rating media files.

Logic block 353 identifies the positive key words/key phrases in a media file segment being reviewed by a user. Control is then transferred to logic block 354 to determine if the media file segment is of interest to the user by analyzing the rate of media progression, such as whether a scroll bar is being depressed or if the media file segment is printed, saved or listened to. Then control is transferred to logic block 355 where the activation value of Profile Objects containing positive key words and key phrases found in a media file are changed. Control is then transferred to logic block 356 where the module ends. This is described in more detail below with regard to FIG. 19.

In an embodiment, during Profile Object Distance value adjustment and Activation value adjustment via rate of media progression in modules 210 and 215 shown in FIG. 2, input from an eye tracking device may also be used. The modules generate a one bit data request to the eye tracking device 103 and the eye-tracking device 103 transfers data, including coordinates of eye gaze, pupil diameters, and head position orientation values.

In an embodiment, the values of pupil diameters, and head position orientation can be used to alter the rate of media progression value. This information is used to change the Distance value and Activation value in Profile Objects.

The changes in coordinates of eye gaze determine which media is being viewed and a rate of media progression. This information is used to change the Distance value and Activation value in Profile Objects.

The pupil diameter measurement can sense changes in eye pupil diameter which can be used to indicate changes in the readers interest while viewing a particular media file segment and is used to change the Profile Object Distance value and Activation Value.

The head position orientation information can be used to indicate changes in the readers interest while viewing a given media file segment and is used to change Profile Object's Distance value and Activation Value.

In an embodiment the Profile Builder module is not necessary because module 220 and module 215 activate Profile Objects that by default are not active and module 204 and module 210 determine relative Distance values for Profile Objects.

III. Profile Builder

A. Detail of User Profile Display and Adjustment Interface

Figure 5A:
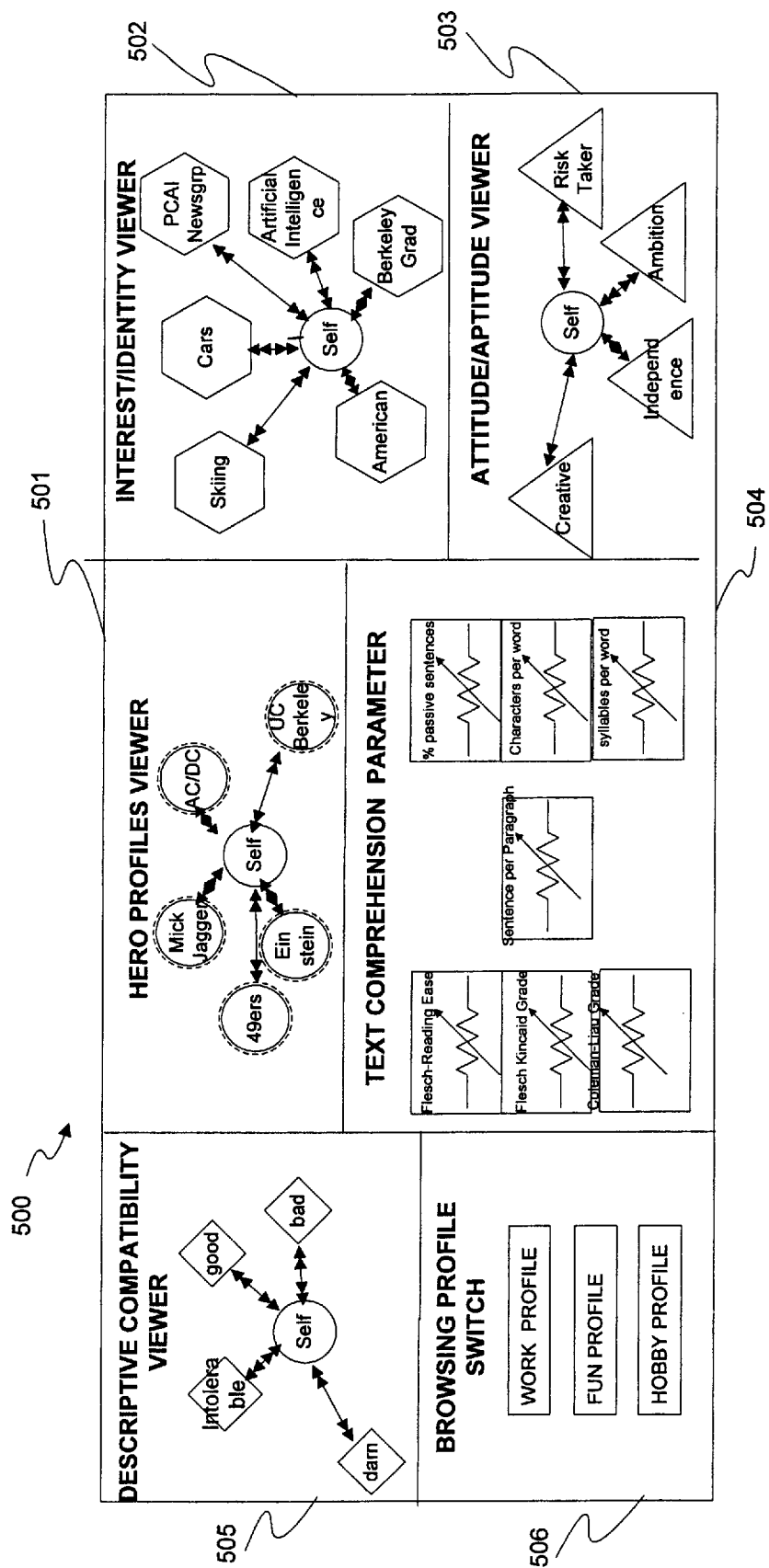
FIG. 5a Illustrates a detail view of a User Profile Display and Adjustment screen according to the present invention.

FIG. 5a illustrates a detailed display screen 500 generated by Search Results interface 208. Display screen 500 includes Descriptor Compatibility viewer 505, Browsing Profile switch 506, Hero Profile viewer 501, Text Comprehension Parameter viewer 504, Interest/Identity viewer 502 and Attitude/Aptitude viewer 503.

Each Viewer, except the Text Comprehension Parameter Viewer, displays Profile Objects.

B. Profile Objects

Profile Objects contain a bundle of key words and/or key phrases that have associated signed numeric values or weights. The impact a Profile Object has in rating a media is file affected by the Profile Object's Distance value (which is representative of the distance between a Profile Object and a Self Object).

The Influence value of each key word/key phrases in a Profile Object is obtained by multiplying a key word/key phrase assigned weight value by the value of the Profile Object's Influencer function described in detail below. The Profile Object's Influencer function value is inversely proportional to this distance from the Self Object. The closer the Profile Object is to the Self Object, the greater the value of the Influencer function and therefore more impact the bundle of key words and key phrases have in evaluating a media file.

Figure 5B:
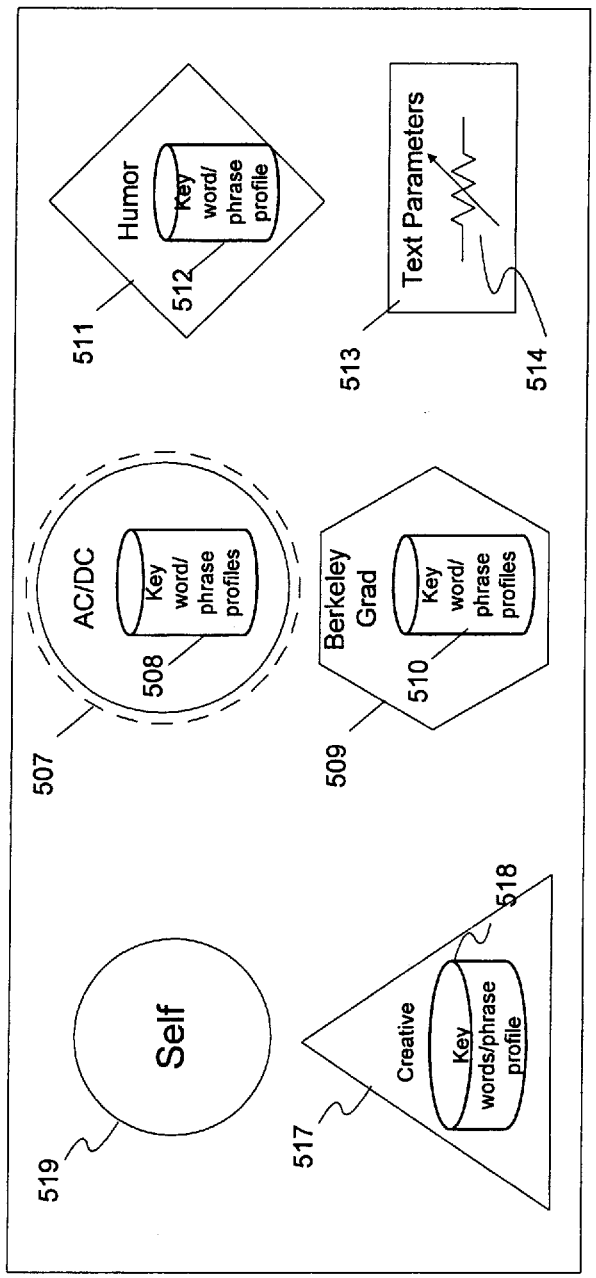
FIG. 5b Illustrates a plurality of Profile Objects, a Self Object and a Media Comprehension Parameter Value Indicator according to the present invention.

FIG. 5b illustrates a Self Object 519 and several Profile Objects 517, 507, 509 and 511 as well as Text Comprehension Parameter 513 that are used in display screen 500, as illustrated in FIG. 5a. In an embodiment, Profile Objects contain at least one key word or key phrase having an associated signed weight value.

Attitude/Aptitude Profile Object 517 contains key words/key phrases 518.

Hero Profile Object 507 contains key words/key phrases 508.

Interest/Identity Profile Object 509 contains key words/key phrases 510.

Descriptor Profile Object 511 contains key words/key phrases 512.

Text Comprehension Parameter 513 contains Parameter value 514.

Self Object 519 is positioned in the center of each of the Viewers in graphic display 500 (except for the Text Comprehension Parameter Viewer). The closer a user positions a Profile Object to the Self Object, the more important the contents of the Profile Object is to the user.

FIG. 6a illustrates a Profile Object 601 with Title 621 "Football". Profile Object 601 includes key words and key phrases 602 having numeric values. The key word "Sports" has an corresponding weight (+3), the key word "Studying" has a corresponding weight (−2) and the key phrase "Going to the ball game" has an corresponding weight (+2).

Each Profile Object has an Alpha value 630 that can be used in interactive question and conjoint analysis question exercises in Profile Builder module to determine the Activation value and Distance value of Profile Objects. This is described in more detail below.

Each Profile Object has an Activation value 623 and Activation Threshold value 622. If a Profile Object's Activation value is greater than its Activation Threshold value, then the Profile Object is active and is used in rating media files. If the Profile Object's Activation value is less than, or equal to, its Activation Threshold value, then the Profile Object is not active and therefore is not used in rating media files.

Figure 6B:
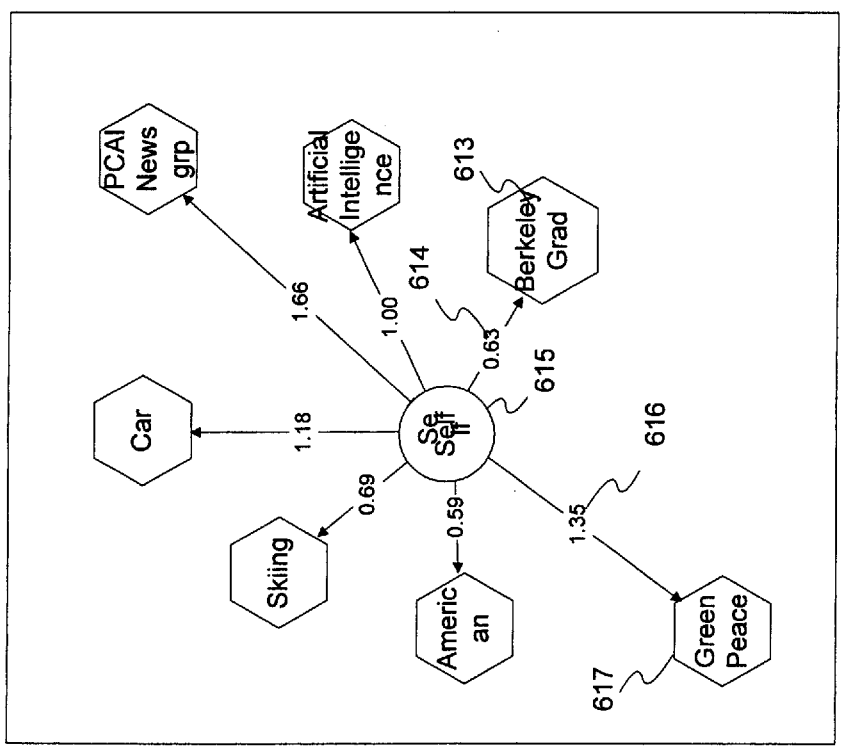
FIG. 6b Illustrates the relationship between a plurality of Profile Objects and a Self Object according to the present invention.

Distance value 625 indicates the distance the Profile Object is from a Self Object. For example, Car Profile Object is 1.18 units from Self Object 615 in FIG. 6b.

In an embodiment, the Influencer function is given by the following equation:

$$\text{Influencer function for (Profile Object)}_i = 1/(d_i + a) \quad \text{Equ. 1}$$

Where $d_i$=the relative distance of the (Profile Object)$_i$ from a Self Object, and a=a small number such that there is not a divide by zero error.

In an embodiment, the distance di is determined as follows: a user positions a number of Profile Objects on an appropriate viewer and arranges their distance from a Self Object in accordance with a user's perceived importance of each Profile Object. The distances of each of the Profile Objects from the Self Object are averaged to obtain the average distance of the Profile Objects to the Self Object, $d_{av}$.

In an embodiment, the relative distance for the Profile Object is then obtained by taking the ratio of the distance of the Profile Object from the Self Object and dividing by $d_{av}$.

For example, the distance 616 between Green Peace Profile Object 617 and Self Object 615 is 1.35 units. The distance 614 between Berkeley Grad Profile Object 613 and Self Object 615 is 0.63 units. Since the distance 616 is greater than the distance 614, the importance placed on key words and key phrases in the Green Peace Profile Object 617 are of proportionately less importance (assuming weight values are the same) than the key words, and key phrases in the Berkeley Grad Profile Object.

The importance of a particular key word, key phrase, or other measurement included in a Profile Object is determined by the product of the Profile Object's Influencer function 650 and the corresponding weight (signed numeric value) associated with each key word or key phrase in the Profile Object. Because the value of the Influencer function changes as the Distance value (distance from the Profile Object to the Self Object) changes, the importance of key words/key phrases located in a particular Profile Object change in relation to the Distance value (distance from a Profile Object to a Self Object).

IV. Profile Builder

Profile Builder 211 includes several methods to enable a user to create a data set containing Profile Object parameters and a text comprehension parameter in Personal Profile database 107. These methods include user interactive methods where the user identifies, activates and positions Profile Objects representing interests, attitudes, and other characteristics of the user. Also, survey-question methods are used, as well as conjoint or choice-based analysis methodologies.

A. The Identity/Interest Evaluation

The Identity/interest test utilizes Identity/interest Profile Objects which include key words and key phrases that help the user identify themselves through their interests and the concepts, ideas and activities by which they identify themselves.

FIG. 7a illustrates an Identity/interest Evaluation Method 307 as illustrated in FIG. 3a. The Identity/interest Evaluation allows the user to activate Interest/Identity Profile Objects and determines their importance to the user. As described above, the closer the Identity/Interest Profile Object is to the Self Object, the greater the importance the Profile Object will have in evaluating a media file.

Bins 701, 703, and 705 contain Identity/interest Profile Objects organized in Bins. These Bins serve as an organizational aid for the user.

Sports/Activities Profile Object bin 701 contains several Identity/Interest Profile objects including a "Soccer" Identity/Interest Profile Object 702.

Hobbies Profile Object bin 703 contains several Identity/Interest Profile objects including a "Computer" Identity/interest Profile Object 704.

Miscellaneous Interests Profile Object bin 705 contains several Identity/interest Profile Objects including a "Fishing" Identity/interest Profile Object 706.

Arrows 707, 708, and 709 illustrate a user positioning or dragging (by way of point and click) Profile Objects from various Profile bins to be placed into an Identity/Interest viewer 710.

The user drags the Interest/identity Profile Object from one of the Bins 701, 703 and 705, to the Interest/identity viewer 710 which causes the Interest/identity Profile Object's Activation value to be set to a specified value above the Interest/identity Profile Object's Activation Threshold value. Thus, the Interest/Identity Profile Object is now active. The user then places the Interest/Identity Profile Object in relation to the Self Object to adjust the Distance value of the Interest/identity Profile Object which affects the Influence values for key words and key phrases used in rating media files.

Identity/interest viewer 710 contains "Football" Interest/Identity Profile Object 711 and Self Object 712.

1. Identity/interest Profile Object

Figure 7B:
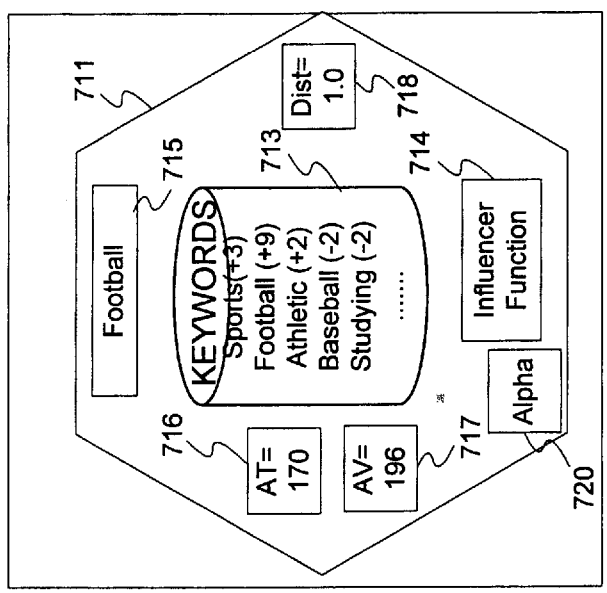
FIG. 7b Illustrates an Identity/Interest Profile Object according to the present invention.

FIG. 7b illustrates an Identity/interest Profile Object. "Football" Identity/Interest Profile Object 711 includes a plurality of key words and key phrases 713. Each key word/key phrase weight value is then multiplied by the value of the Interest/identity Profile Objects Influencer function 714 which results in an Influence value for each key word/key phrase. The Profile Object's Influencer function 714 changes value according to the Distance value 718 which represents the distance between various Profile Objects and the Self Object 712. Profile Object 711 contains Title 715. Activation Threshold 716, Activation value 717, Alpha value 720 and Distance value 718.

B. Personal Hero Evaluation

The Personal Hero Evaluation 308, as illustrated in FIG. 3a, utilizes Hero Profile Objects containing key words and key phrases that relate to individuals that may be considered stereotypes.

FIG. 8a illustrates a Personal Hero evaluator 308. The Personal Hero evaluator 308 gathers Profile Objects and determines their importance to the user. As above, the closer a Hero Profile Object is to the Self Object, the greater the importance the Profile Object will have in evaluating a media file.

Profile Object bins 801, 805, and 808 include Personal Hero Profile Objects.

People Profile Object bin 801 includes Personal Hero Profile Objects that are in several categories. Each category serves as an organizational aid in assisting a user in finding certain Hero Profile Objects that are identified by people. For example, the Athlete Category contains a "Mike Tyson" Hero Profile Object 802 and a "Joe Montana" Hero Profile Object 803.

The Groups Profile Object bin 805 includes Hero Profile Objects such as "Peace Corps" Hero Profile Object 807.

Animal Profile Object bin 808 contains several Hero Profile Objects such as "Tiger" Hero Profile Object 809.

The user drags a Hero Profile Object from one of the bins 801, 805 and 808, to the Hero viewer 812 which causes the Hero Profile Object's Activation value to be set to a specified value above the Hero Profile Object's Activation Threshold value. Thus, the Hero Profile Object is now active. The user then places the Hero Profile Object in relation to the Self Object to adjust the Distance value of the Hero Profile Object used in rating media files.

Personal Hero viewer 812 contains Self Object 811 and "Abe Lincoln" Hero Profile Object 813.

Arrows 804, 806, and 810, as above, illustrate the positioning of Hero Profile Objects by a user relative to a Self Object 811.

1. Hero Profile Object

Figure 8B:
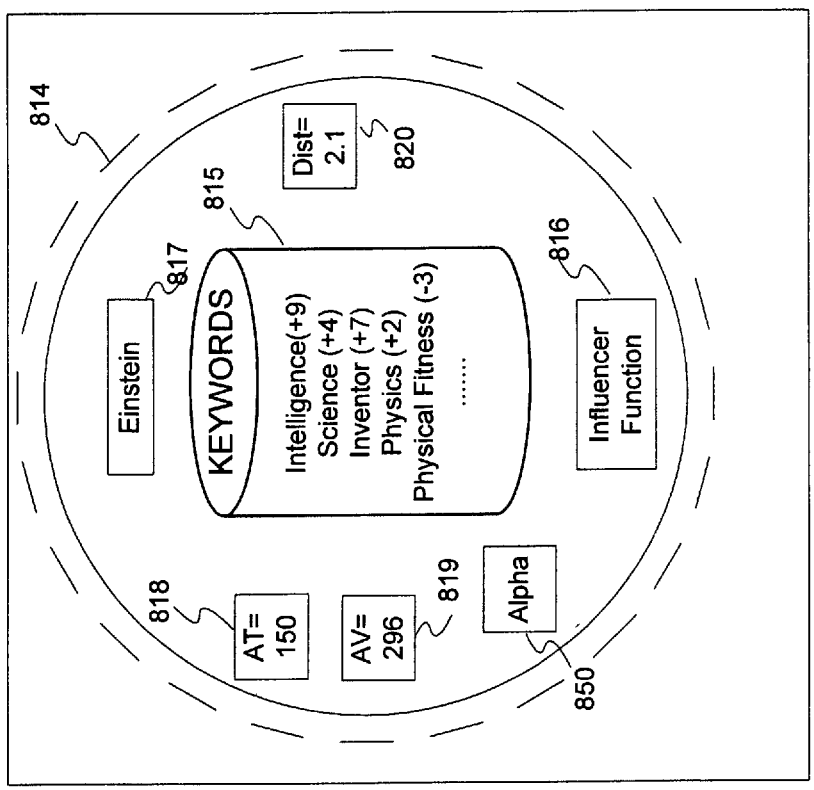
FIG. 8b Illustrates a Hero Profile Object according to the present invention.
Figure 9A:
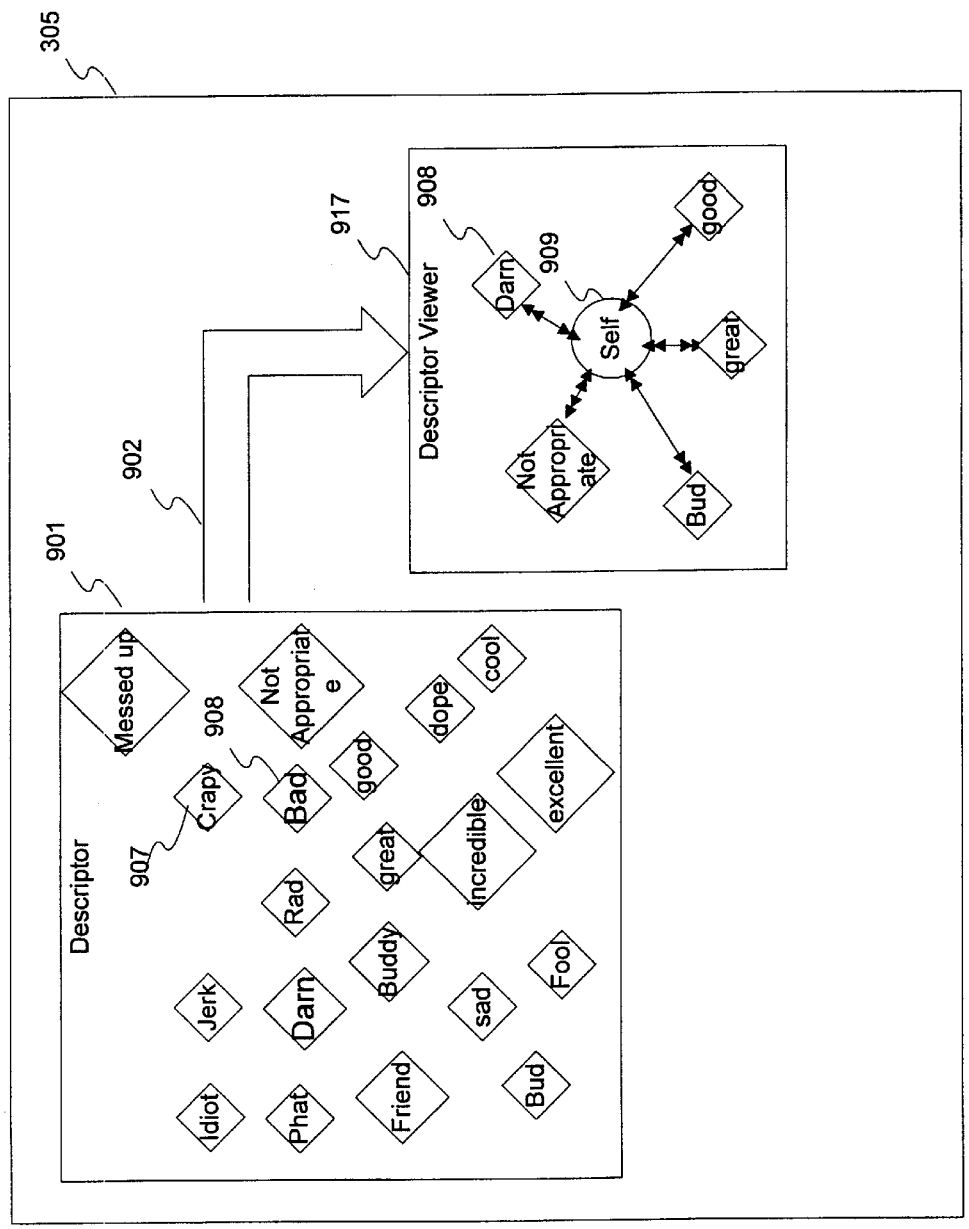
FIG. 9a Illustrates the Descriptor (Adjective/Adverb/Simile/Metaphor) Sensitivity Evaluation method used in Profile Builder module 211 shown in FIG. 3a according to the present invention.

FIG. 8b illustrates a Hero Profile Object. "Einstein" Hero Profile Object 814 includes key words and key phrases having associated weight values. The key word/key phrase value is multiplied by Hero Profile Object's Influencer function 816 to create the Influence value of each key word/key phrase. The value of the Influencer function 816 changes according to the Distance value that represents the distance between the Profile Object and the Self Object. Profile Object 814 contains Title 817, Activation Threshold 818, Activation value 819, Alpha value 850, Distance value 820, and Influencer function 816.

C. Descriptor Sensitivity Evaluation

Descriptor Sensitivity evaluator 305, as illustrated in FIG. 3a, allows a user to select descriptors with which the user feels comfortable. The descriptors then may be used in evaluating a media file for the user.

FIG. 9a Illustrates a Descriptor Sensitivity evaluator 305. A Descriptor Sensitivity evaluator 305 gathers Profile Objects and determines their importance to the user. These Descriptor Profile Objects contain key words and key phrases of descriptors such as adjectives, adverbs, metaphors and similes. The lower the Profile Objects Distance value, the closer the Profile Object is to the Self Object and the greater the importance the Profile Object will have in evaluating a rating media files.

Descriptor Profile Objects bin 901 includes several Descriptor Profile Objects, such as "Crapy" Descriptor Profile Object 907 and "Bad" Descriptor Profile Object 908.

The user drags the Descriptor Profile Object from bin 901 to the Descriptor viewer 917 which causes the Descriptor Profile Object's Activation value to be set to a specified value above the Descriptor Profile Object's Activation Threshold value. Thus, the Descriptor Profile Object is now active. The user then places the Descriptor Profile Object in relation to the Self Object to adjust the Distance value of the Descriptor Profile Object which changes the impact the Descriptor Profile Object has in rating media files.

Arrow 902 illustrates how a user can position Profile Objects from a Profile bin 901 relative to a Self Object 909 which sets Profile Object Distance values as described above.

Descriptor Compatibility viewer 917 contains Self Object 909 and "Darn" Descriptor Profile Object 908.

1. Descriptor Profile Object

Figure 9B:
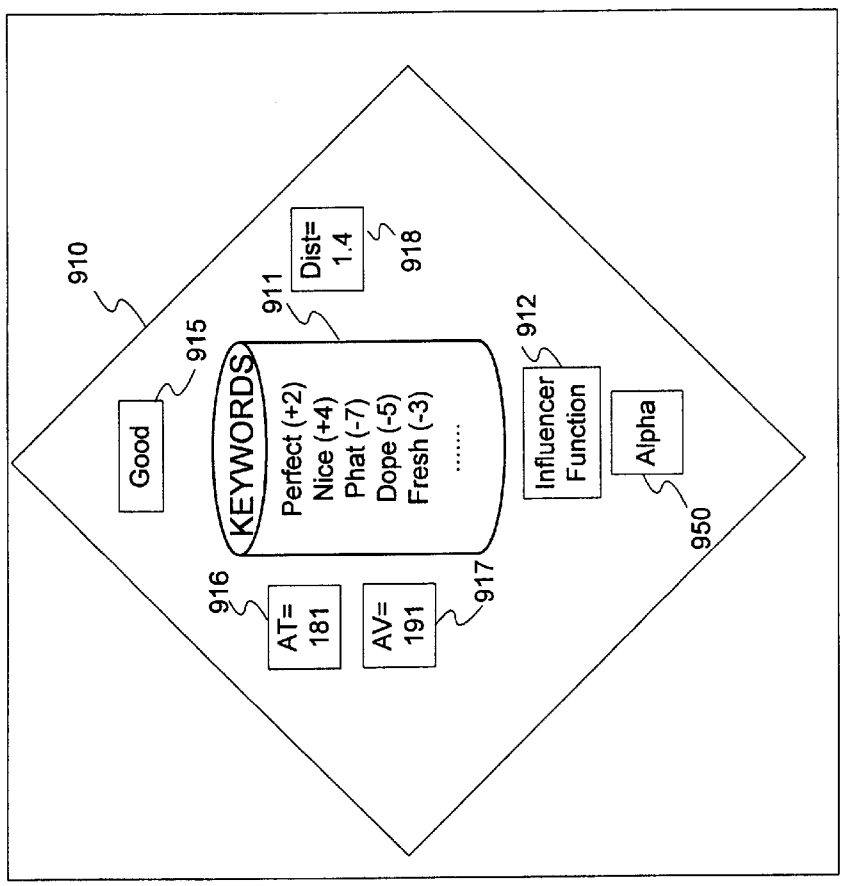
FIG. 9b Illustrates a Descriptor Profile Object according to the present invention.
Figure 10C:
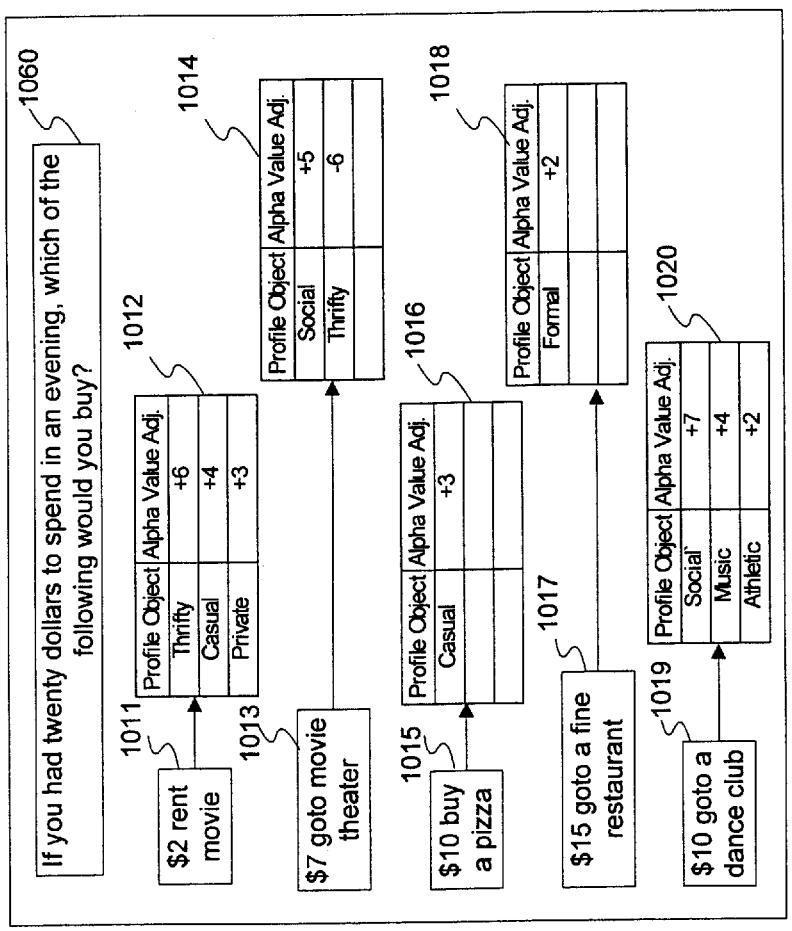
FIG. 10c illustrates an Attitude/Aptitude Evaluation sample conjoint analysis question according to the present invention.

FIG. 9b illustrates a "Good" Descriptor Profile Object 910. "Good" Profile Object 910 includes key words and key phrases 911 and Influencer function 912. The positive weighted key words/key phrases contain descriptors that are representative of the Profile Object's Title word's/phrase's vernacular style. The negative weighted key words/key phrases contain descriptors that are not representative of the Profile Object's Title word's/phrase's vernacular style. The Influencer function 912 and signed weight values associated with key words 911 are used as described above. Profile Object 910 contains Title 915, Activation Threshold 916, Activation value 917, Alpha value 950 and Distance value 918.

D. Attitude/Aptitude Evaluation

Attitude/Aptitude Evaluation 306, as shown in FIG. 3a, is a personality test that isolates interests, values, and attitudes of a user.

FIG. 10a illustrates the steps of an Attitude/Aptitude Evaluation 306, which consists of a battery of questions and user interactive exercises that extracts Attitude/Aptitude Profile Objects and adjusts their Distance value.

Logic Block 1001 initiates an Attitude/Aptitude Evaluation 306. Logic block 1002 which queries a user in order to isolate interests and general attitudes. Logic block 1003 activates Attitude/Aptitude Profile Objects and determines their Distance values based on answers to questions in logic block 1002.

Each Attitude/Aptitude Profile Object has an Alpha value 1035 that is used to determine the Distance value of the Attitude/Aptitude Profile Object. This Alpha value is used only during question exercises as illustrated in the Attitude/Aptitude Evaluation method.

At the beginning of the Attitude/Aptitude Evaluation method, all Attitude/Aptitude Profile Object Alpha values are set to zero.

During the evaluation, each answer causes adjustments in the Alpha value of certain Attitude/Aptitude Profile Objects. For example, an answer to a question can cause an Attitude/Aptitude Profile Object Alpha value to increase by 5 or decrease by 3.

At the end of Attitude/Aptitude Evaluation 306, all numerical adjustments corresponding to an Attitude/Aptitude Profile Object Alpha value are summed and the resultant Alpha value total is used to determine the Attitude/Aptitude Profile Object Distance value and Activation value as described below. In an embodiment, if the resultant sum of a Profile Object's Alpha value is negative or zero, then the Profile Object is not activated and not positioned in an Attitude/Aptitude Profile screen.

In an alternate embodiment, if the resultant sum of an Attitude/Aptitude Profile Object Alpha value is negative, then the absolute value of the sum is used to determine the distance from the Profile Object and the Self Object and each of the associated key word/key phrase weight values in the Profile Object is multiplied by −1 and the Profile Object is activated by setting the Activation value to a predetermined number above the Activation Threshold value.

In an embodiment, Attitude/Aptitude Profile Objects with Alpha values totaling zero or less are not activated. Attitude/Aptitude Profile Objects with Alpha values greater than zero have their Activation value set to a predetermined value above the Profile Object's Activation Threshold value, thereby causing the Profile Object to become active.

The average of the sum totals of each remaining Attitude/Aptitude Profile Object positive Alpha value is then calculated. This average is used to assign a relative Distance value for a each Attitude/Aptitude Profile Object with a positive Alpha value in the following manner. Each Distance value is calculated by taking the ratio of the average of all Profile Object positive Alpha values and the selected Profile Object's Alpha value. Thus, for example, if the largest Alpha value is 150 for Independence Attitude/Aptitude Profile Object; and the smallest Alpha value is 10 for "Team" Attitude/Aptitude Profile Object; and the average Profile Object Alpha value is 100. Then relative Distance value assignments would be the following: Independence Profile Object Distance value=100/150=0.67 units and Team Profile Object Distance value=100/10=10 units.

1. Example of an Attitude/Aptitude Question

FIG. 10b illustrates a sample Attitude/Aptitude Question. Question 1010 is statement from a series of such statements constituting an Attitude/Aptitude Evaluation where user reactions are measured.

Selecting answer button 1004 corresponds to a user agreeing with statement 1010. Selecting answer button 1005 corresponds to a user not knowing whether to agree with statement 1010. Selecting answer button 1006 corresponds to a user disagreeing with statement 1010.

Tables 1007, 1008, and 1009 illustrate Attitude/Aptitude Profile Object Alpha value adjustments for an "Independent" Attitude/Aptitude Profile Object, an "Entrepreneur" Attitude/Aptitude Profile Object, a "Team" Attitude/Aptitude Profile Object, and a "Security" Attitude/Aptitude Profile Object. As can be seen, the Attitude/Aptitude Profile Object's Alpha values are adjusted based on answers to question 1010. The Attitude/Aptitude Profile Object Alpha value is used to determine the Distance value of the Attitude/Aptitude Profile Object. This is illustrated in table 1007 where an "Independent" Attitude/Aptitude Profile Object has a corresponding Alpha value adjustment of (+5), "Entrepreneur" Attitude/Aptitude Profile Object has a corresponding Alpha value of (+8), and a "Team" Attitude/Aptitude Profile Object has a corresponding Alpha value adjustment of (−5). These Attitude/Aptitude Profile Object Alpha value adjustments are used to change their corresponding Profile Object Alpha values that correspond to user's selecting answer buttons 1004, 1005, and 1006.

Thus, if a user selects answer button 1004, indicating agreement with statement 1010, then the Alpha value associated with the Independent Profile Object is adjusted by (+5). Likewise, the Entrepreneur Profile Object Alpha value is adjusted by (+8), while the Team Profile Object is adjusted by (−5). If the user selects answer button 1005, indicating not knowing whether to agree with statement 1010, then Independent Attitude/Aptitude Profile Object Alpha value is adjusted by (+4) and the Security Attitude/Aptitude Profile Object is also adjusted by (+4). If the user selects Disagree button 1006, the corresponding Attitude/Aptitude Profile Objects are likewise adjusted.

2. Example of a Conjoint Analysis Attitude/Aptitude Test Question

FIG. 10c illustrates a sample conjoint analysis Attitude/Aptitude evaluation which may be used instead of, or in conjunction with, the Attitude/Aptitude Evaluation illustrated in FIG. 10b. Conjoint analysis, or choice based questions, ask a user to discover bundles of items that are close to the taste of the user. Through this type of questioning, it is possible to discover Profile Objects that are relevant to a user.

In an embodiment, answers to such conjoint analysis questions may associate certain Profile Objects consistently.

For example, if Profile Object A and Profile Object B are both having Alpha value adjustments simultaneously, in substantially the same amount, in a predetermined number of such questions, the two Profile Objects may then be classified as linked to form a new Profile Object which has all of the key words and key phrases with corresponding values in Profile Object A and Profile Object B and having an Activation value and Distance value equal to the average of the respective values contained in Profile Object A and Profile Object B.

Logic block 1060 illustrates a question and logic blocks 1011, 1013, 1015, 1017 and 1019 illustrate possible answers that may be selected by a user. The answers correspond to tables 1012, 1014, 1016, 1018, and 1020 which may be used to adjust Attitude/Aptitude Profile Objects Alpha values.

3. Attitude/Aptitude Profile Object

Figure 10D:
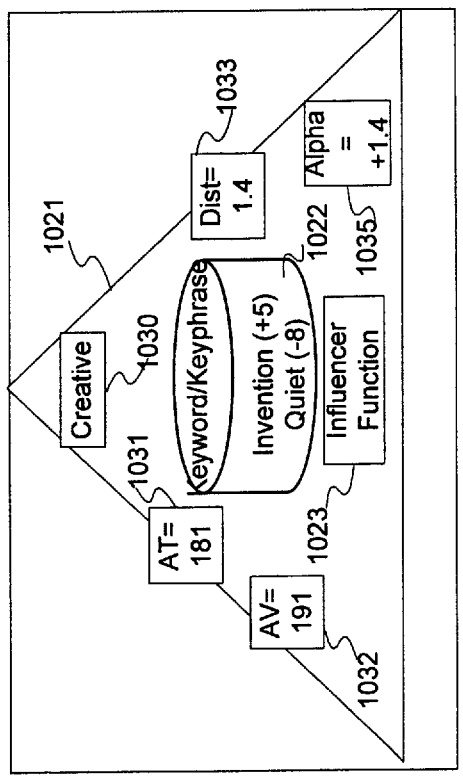
FIG. 10d Illustrates an Attitude/Aptitude Profile Object according to the present invention.

FIG. 10*d* illustrates an Attitude/Aptitude Profile Object, such as a "Creative" Attitude/Aptitude Profile Object 1021, which contains key words and key phrases. Profile Objects Influencer function 1023 is multiplied by key word or key phrase weight values to create influence values as described above. Profile Object 1021 contains Title 1030, Activation Threshold (AT) 1031, Activation value (AV) 1032, Key words/Key phrases with corresponding weight values 1022, Distance value (Dist.) 1033 and Alpha value (Alpha) 1035.

VI. Methods to Determine Media File Acceptance

The following methods, as illustrated in logic blocks 302 in FIG. 3*a*, are used to determine the suitability of a media file based on a user's text media comprehension ability.

A. Method for Determining Text Media Comprehension Parameters

Figure 11:
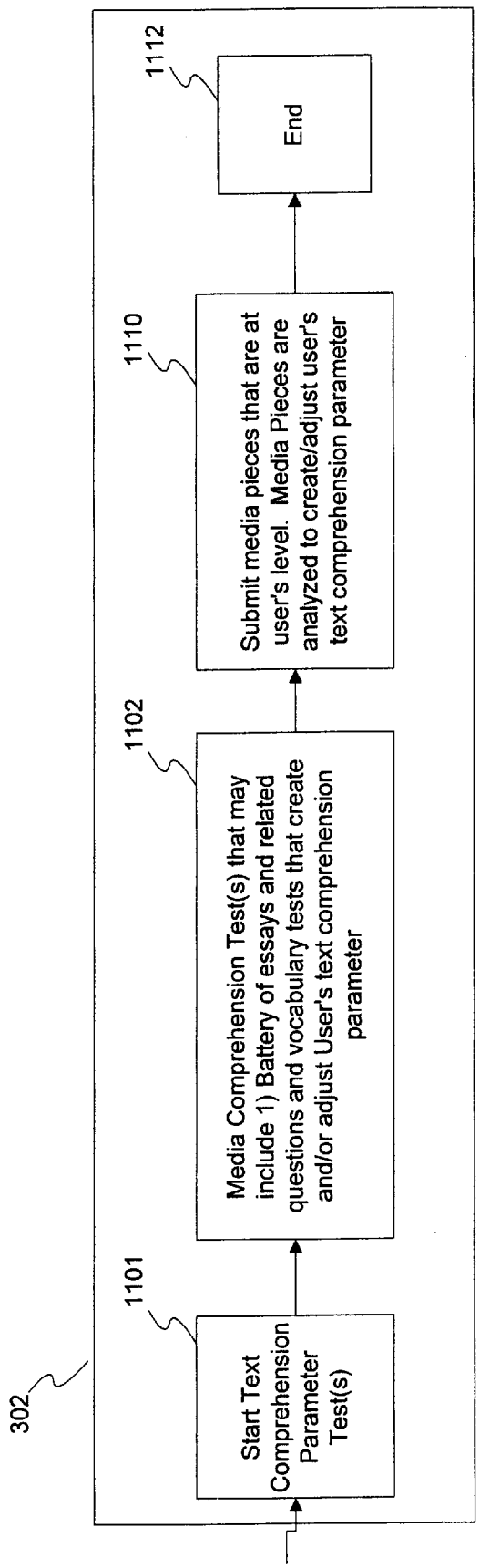
FIG. 11 Illustrates a Method for Determining a User's Text Media Comprehension Parameter module 302 used in the Profile Builder module 211 shown in FIG. 3a according to the present invention.

FIG. 11 illustrates a method for determining a Text Media Comprehension parameter for a user. Logic block 1101 initiates the testing of user's text comprehension ability. Logic block 1102 determines text media comprehension parameter for a user by asking the user to read a battery of essay questions and answers questions regarding the essays and subjects the user to a list of vocabulary questions where the user's Text Media Comprehension parameter is created or adjusted in a Personal Profile database 107 data set. Text Media Comprehension parameter may include average and standard deviation of characters per word, syllables per word, words per sentence, and sentences per paragraph in relation to user's performance on these tests. Also, text readability statistics such as Flesch-Reading Ease, Flesch Kincaid Grade, Coleman-Liau Grade Level, Barmuth Grade Level can be used as a Text Media Comprehension parameter.

Control is then transferred to logic block 1110 which allows a user to submit reading material which the user believes to be at the user's reading level. The content is analyzed and a Text Media Comprehension parameter described above is generated and used to create or adjust the ia Text Media Comprehension parameter stored in a Personal Profile database 107 data set. Control is then transferred to logic block 1112 where the method ends.

It should be understood that various combinations of tests can create a Text Media Comprehension parameter and methods to derive a Text Media Comprehension parameter can be used or omitted.

In an embodiment, more than one Text Media Comprehension parameter may be derived and stored in Personal Profile database 107 to evaluate media files.

VI. Media Evaluation

A. Choosing Media Files to be Evaluated on Search Screen

Figure 12:
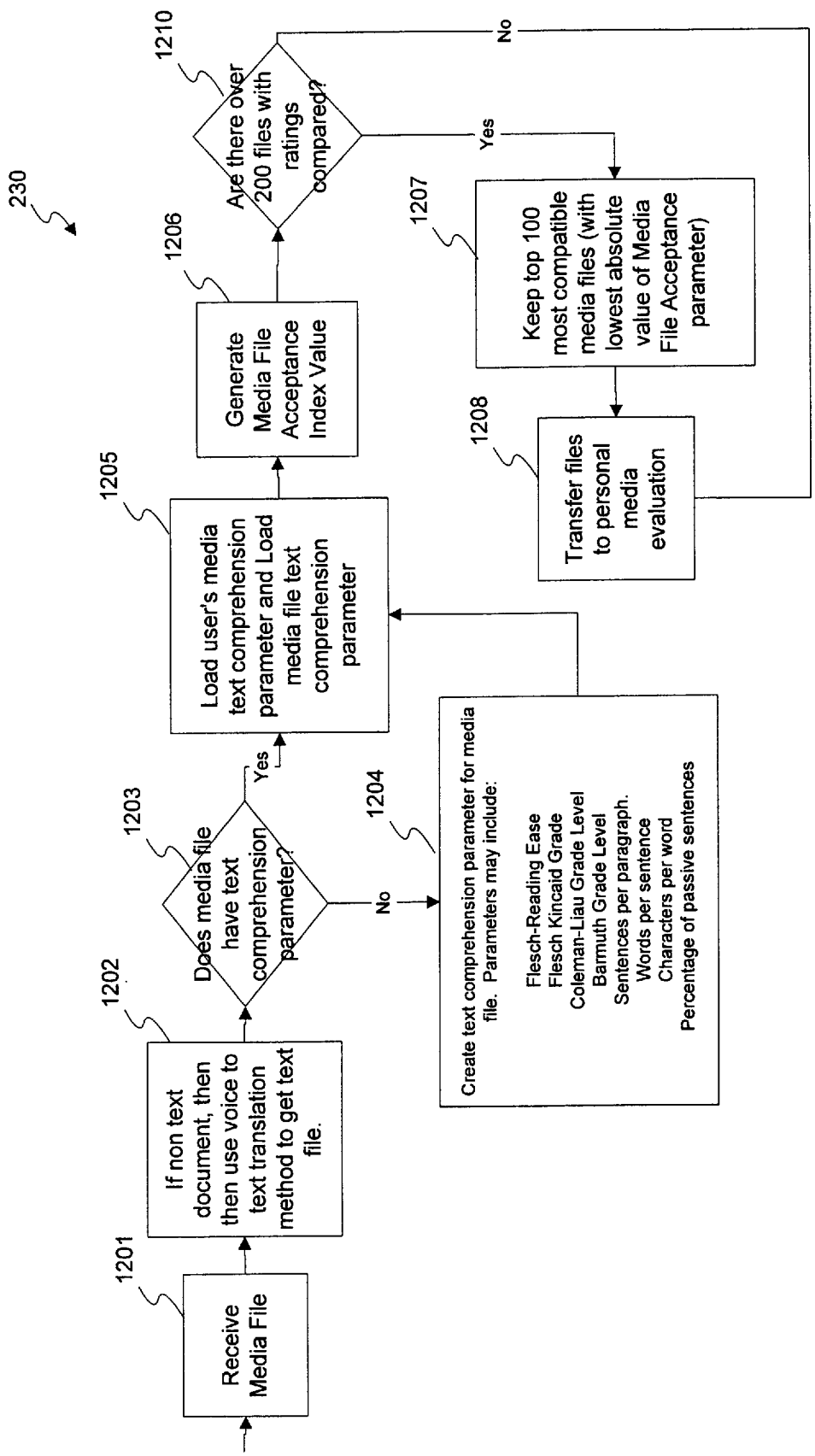
FIG. 12 Illustrates a Method for Determining Acceptance of a Media File using Text Comprehension Parameter used in module 230 shown in FIG. 2 according to the present invention.

FIG. 12 illustrates a method for Determining Acceptance of a Media File module Using Text Comprehension parameter 230, as illustrated in FIG. 2. Logic block 1201 receives the media file from Search Engine interface 109. If the media file contains a sound file with voice information, voice information is translated into text using voice recognition process in logic block 1202 as described in FIG. 20. In an embodiment, only text files are evaluated, and logic block 1202 is not used.

Logic block 1203 determines if the media file already contains a Text Comprehension parameter. If yes, then control is transferred to logic block 1205. If no, then control is transferred to logic block 1204.

Logic block 1204 creates a Text Comprehension parameter for a media file. The Text Comprehension parameter may include the Flesch-Reading Ease measurement, the Flesch Kincaid Grade measurement, the Coleman-Liau Grade Level test, and/or the Barmuth Grade Level test. Other Text Comprehension parameters may include average and/or standard deviation of number of sentences per paragraph, words per sentence, characters per word, and syllables per word.

Logic block 1205 loads the user's Text Comprehension parameter value from Personal Profile database 107 data set and retrieves the media file Text Comprehension parameter from logic block 1204. The media file Text Comprehension parameter is compared to the corresponding user's Text Comprehension parameter in logic block 1206.

Logic block 1206 generates a media acceptance rating for the media file based on the media file Text Comprehension parameter and user Text Comprehension parameter. The media file's Text Comprehension parameter is subtracted from the corresponding user's Text Comprehension parameter to obtain an associated value identified as the acceptance rating. The lower the absolute value of the media acceptance rating for a particular media file, the more compatible the media file is to the particular user. In alternate embodiments, multiple media acceptance ratings may be obtained using all or various combinations of the Text Comprehension parameters above.

Logic block 1210 determines if there are over two hundred files having media acceptance ratings. If yes, control is transferred to logic block 1207. If no, control is transferred to logic block 1208.

Logic block 1207 keeps the top 100 media files which are most compatible with the user (the files with the lowest absolute value of the media acceptance rating). Control is then transferred to logic block 1208 where the files are transferred to Personal Media Evaluation module 205, as illustrated in FIG. 2.

B. Media Evaluation Method

FIG. 13 illustrates a Media Evaluation module 205, as illustrated in FIG. 2, which creates indicator ratings for a retrieved media file that represents the likelihood of interest of the media file to a specific user.

Media file 1301 includes text information and a text acceptance rating which were determined in logic block 230, as illustrated in FIG. 2. The text information for the media file 1301 is transferred to logic block 1317*a–d*.

Figure 20:
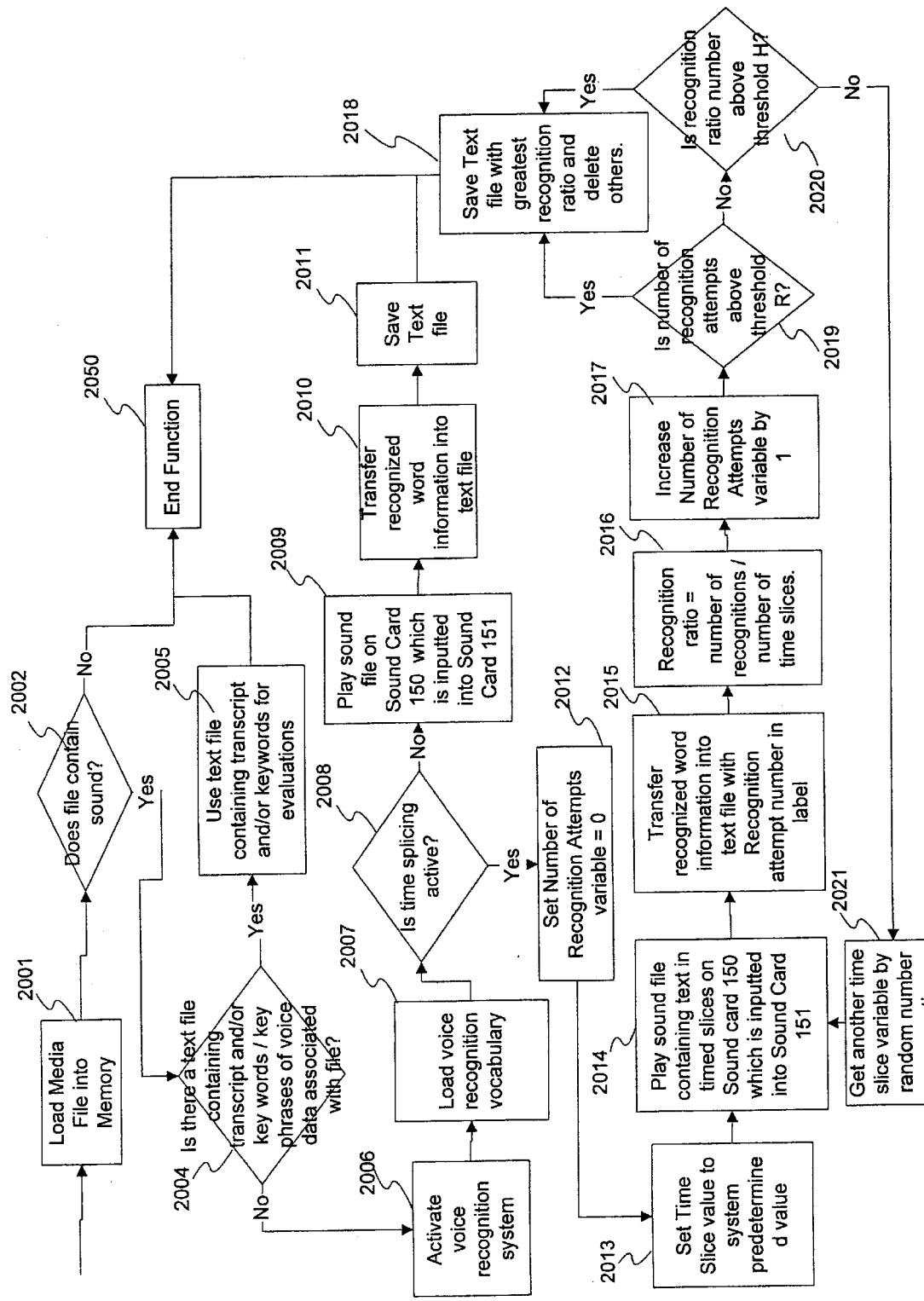
FIG. 20 Illustrates a Method of Translating a Media File to Text File according to the present invention.

If media file 1302 contains non-text, a voice-to-text translation method as illustrated in FIG. 20 is implemented and transfers text information to logic block 1317*a–d*. In an embodiment only text files are evaluated, and logic block 1302 is not used.

Figure 14:
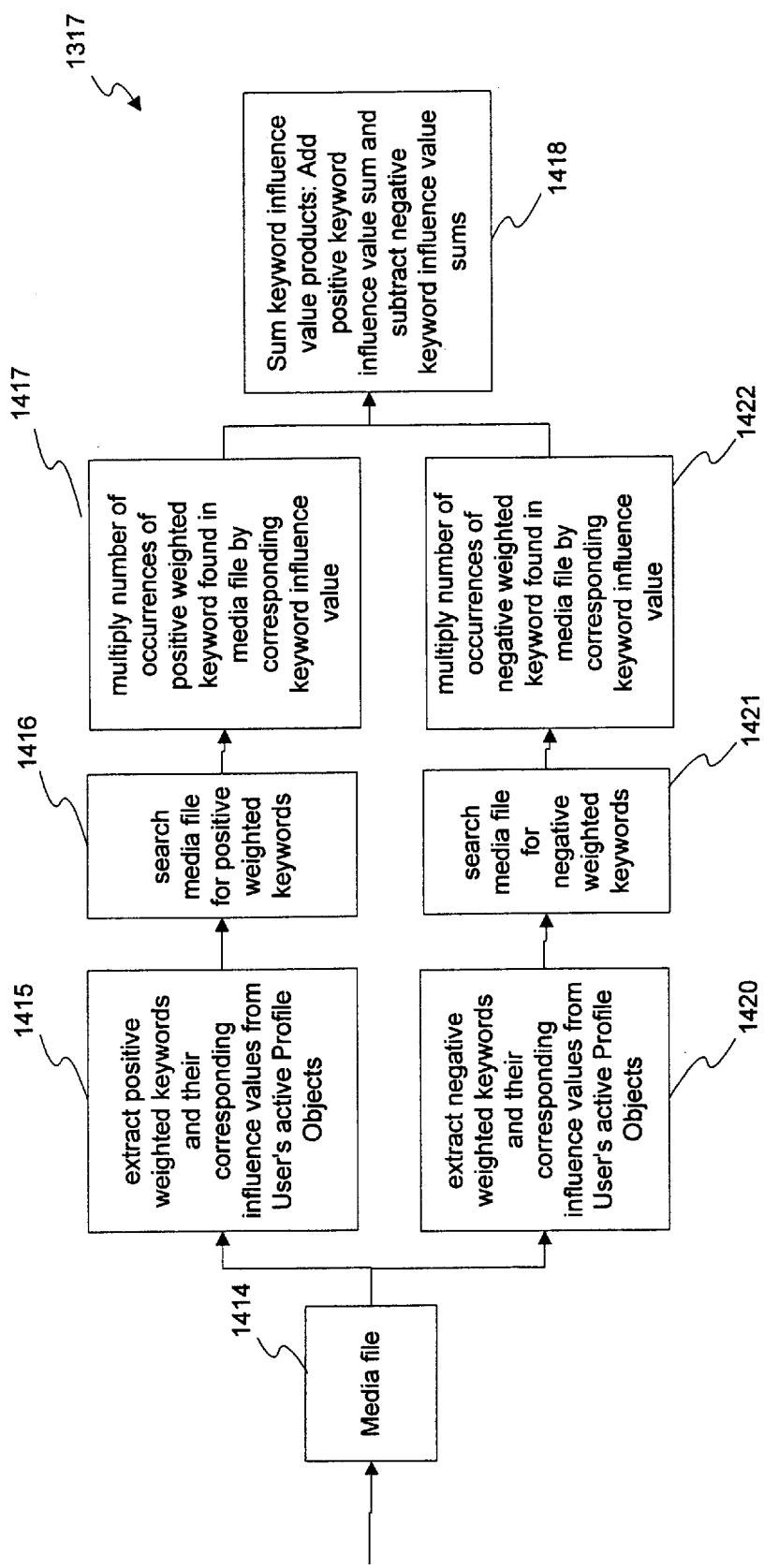
FIG. 14 Illustrates a Media File Key Word Valuation method used in Media Evaluation module 205 shown FIG. 13 according to the present invention.

Media text file 1301 is then evaluated in logic block 1317*a–d* using key word(s) and key phrase(s), as illustrated in FIG. 14.

FIG. 14 illustrates a Media File Key Word Valuation Method used in logic blocks 1317a–d of FIG. 13. Logic block 1414 opens a media file and transfers text information to logic blocks 1415 and 1420.

Logic block 1415 extracts the user's Active Profile Object positive weighted key words and key phrases along with their respective Influence value (which is derived from the key word/key phrase signed weight multiplied by the value of its Influencer function) from a user's Profile Objects. Logic block 1416 searches the media file for the user's active Profile Object positive key words and key phrases. Control is then transferred to logic block 1417 where each positive key word or key phrase Influence value is multiplied by the number of instances the key word or key phrase are found in the media file. Logic block 1417 contains a positive or zero value since positive key word and key phrase values are all non-negative.

Logic block 1420 extracts the users active Profile Object negative weighted key words and key phrases along with their respective Influence value from the user's Profile Objects. Logic block 1421 searches the media file for the user's active Profile Object negative key words and key phrases. Control is then transferred to logic block 1422 where the each negative key word or key phrase Influence value is multiplied by the number of instances the key word or key phrase are found in the media file. Logic block 1422 contains a negative or zero value since negative key word and key phrase values are all non-positive. Control is then transferred to logic block 1418.

In an embodiment the number of negative and positive key words is normalized by dividing by the total number of words in the media file.

Logic block 1418 sums the products (incidence of key words multiplied by Influence value) from logic blocks 1417 and 1422 to obtain an index value. As can be seen from FIG. 13, index values are output from logic blocks 1317a–d to display an Identity, Hero and MCR rating value shown in FIG. 13. The index values from 1317a and 1317b are averaged in logic block 1318. Index values 1515, 1516 and 1514 are displayed.

In an embodiment, the following equation illustrates the key word valuation method illustrated in FIG. 14:

$$(MediaFile)_i = \sum_j \sum_k (fq)_{ik}(w)_{jk}(Fun)_j \qquad \text{Equ. 2}$$

where:
The first sum is over the k key words/key phrases in the jth Profile Object and the second sum is over the j Profile Objects,
and where:
(fq)$_{ik}$=the number of occurrences of the kth key word/key phrase in the ith media file divided by the total number of words in the ith media file.
(w)$_{jk}$=assigned weight value associated with the kth key word/key phrase in profile object j (Fun)$_j$= Influencer function for Profile Object j.

VII. Search Results Screen with Content to User Fitness Indicators

FIG. 15a illustrates a Search Results screen having Content to User fitness indicators ratings generated by Search Results interface module 208, illustrated in FIG. 2. Field 1501 displays a user name and the Personal Profile database 107 data set that is used to create the indicator value Ratings.

Field 1550 contains the subject word(s) used by search engine 125 to retrieve media files. In an embodiment, search engine 125 is not used to retrieve media files and Field 1550 is not used. In an embodiment, the user can specify the location of media files for evaluation.

Field 1502 is the title field.

Figure 15B:
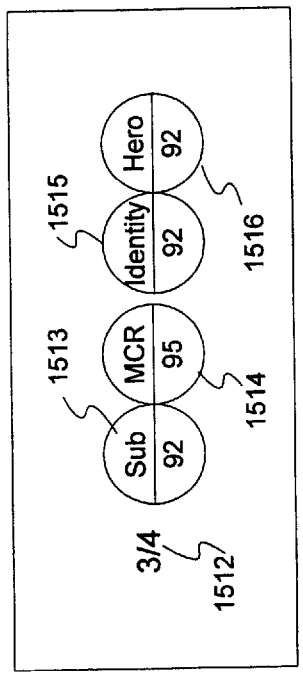
FIG. 15b Illustrates a Content to User Fitness Indicator block according to the present invention.

Field 1503 contains choice number 3 URL address and text synopsis retrieved from Search Engine interface 109 as well as three corresponding Indicator rating fields displaying evaluation ratings of the content of each type of media file at the choice 3 internet site. FIG. 15b illustrates an Indicator rating field containing indicator index values described in detail below.

Indicator Fields contain the following four indicator value ratings: Subject, Media Compatibility Rating ("MCR"), Identity/interest, and Hero. The Subject rating value is the subject match value that is received from the Search Engine interface 109. The other three indicator value ratings correspond to evaluation ratings derived from a data set in Personal Profile database 109 and evaluates a media file in the context of the current user.

Column 1509 represents the text media file column. Indicator value ratings corresponding to text media files in search result column 1502 are provided.

Column 1510 represents the audio media file column. Indicator value ratings corresponding to media files in search result column 1502 are provided.

Column 1511 represents the video/visual media file column. Indicator value ratings corresponding to text media files obtained from speech-to-text translation of video/sound file as illustrated in FIG. 20.

Indicator field 1505 contains indicator value ratings corresponding to choice 1 in search results column 1502. The "2/2" represents the second file out of the two files at that URL location. The denominator indicates the number of files at the internet site, and the numerator represents that the indicator value ratings correspond to the second media file at the web address.

Indicator field 1506 illustrates empty indicator value ratings since there are no video files at the choice number 2 internet site.

Similarly, indicator value rating field 1507 illustrates indicator value ratings of the first of two video media files at the choice number 4 internet site.

A. Indicator Value Field

Each indicator field contains indicator values corresponding to a rating of a media file, as illustrated in FIG. 15b. Sub=subject index rating value which is received from Search Engine 125, MCR=Media Compatibility Rating obtained from the Descriptor Compatibility valuation of a media file, Identity=Identity/Interest index rating value which is obtained from the Identity/Interest valuation and the Attitude/Aptitude valuation of a media file, Hero=hero index rating value which is obtained from the Hero valuation of a media file.

In this example, 1513 is the subject index rating value, 1514 is the media compatibility index rating value, 1515 is the Identity/interest index rating value and 1516 is the hero index rating value.

It should be understood that in alternate embodiments, various combinations of index ratings and/or indicators can be used or omitted.

In an embodiment, valuation of media files can be accomplished by evaluating a file linked to a media file where the linked file contains a synopsis of the contents of the media file and/or key words/key phrases contained in and/or describing contents of media file. This could be accomplished by having both the media file and the linked synopsis file having the same file name, but different file extensions. In an embodiment, the file extension for the synopsis could be ".syn". For example, a media file on butterflies could be "butterfly 1.txt" and the synopsis file could be "butterfly1.syn".

VIII. Key word Interest Media File Markup Method

FIG. 16 illustrates the Key word Interest Media File Markup Method used in module 209 in FIG. 2. Logic block 1600 translates the voice information in the media file to text, if necessary, as illustrated in FIG. 20. In an embodiment, only text files are used in the Key Word Interest Media File Markup Method and accordingly, logic block 1600 is not used. Logic block 1601 locates key words of active Profile Objects located in a media file input from Search Result interface 208. The key words are obtained from active Profile Objects stored in Personal Profile database 107 data set. An identified active Profile Object key word in the media file is assigned a value corresponding to the product of the associated weight value and associated Influencer function value. The words neighboring the located key word are then identified in the media file and are also assigned a value in logic block 1603. The words neighboring the active Profile Object key word in a media file are assigned values that are of an absolute value less than the key word value.

In an embodiment, neighboring words of an identified positive key word are assigned values based on the following equation:

$X$=Decrease in value of neighboring word while $X>0$ $X$=(key word value)−(# of words away from key word/key phrase)

When $x <=0$ assignment ends.

Neighboring words of an identified negative key word/key phrase are assigned values by the following equation.

$Y$=Increase in value of neighboring word while $Y<0$ $Y$=(key word value)+(# of words away from key word/key phrase)

When $y>=0$ assignment ends

In an embodiment, certain special "negation words/phrases" such as "not", "never", "no" that are in a predetermined range from a key word will change the signed value of the key word instance in the media file. In another embodiment, these negation words can be made to trigger sign value change of a key word if they are only on the left of a identified key word.

In an embodiment, certain special "amplification" words/phrases such as "very", "much", "a lot of", amplify the magnitude of a key word in a specific range and/or to the left of a identified key word.

In an embodiment, certain special "reduction" words/phrases such as "little", "tiny", "a touch of", reduce the magnitude of a key word in a predetermined range and/or to the left of the identified key word.

In an embodiment, certain words such as articles ("the", "a", "an") are ignored in the key word media file markup method.

In an embodiment, key phrases can be used in the Key word Interest Document Markup Method.

Thus, a media file has been marked revealing the major points of interest and/or disinterest to a user having profile objects. The media file may be appropriately highlighted saving valuable user time in locating desired information.

A. Interest Sound/Video File Markup Example

Figure 16A:
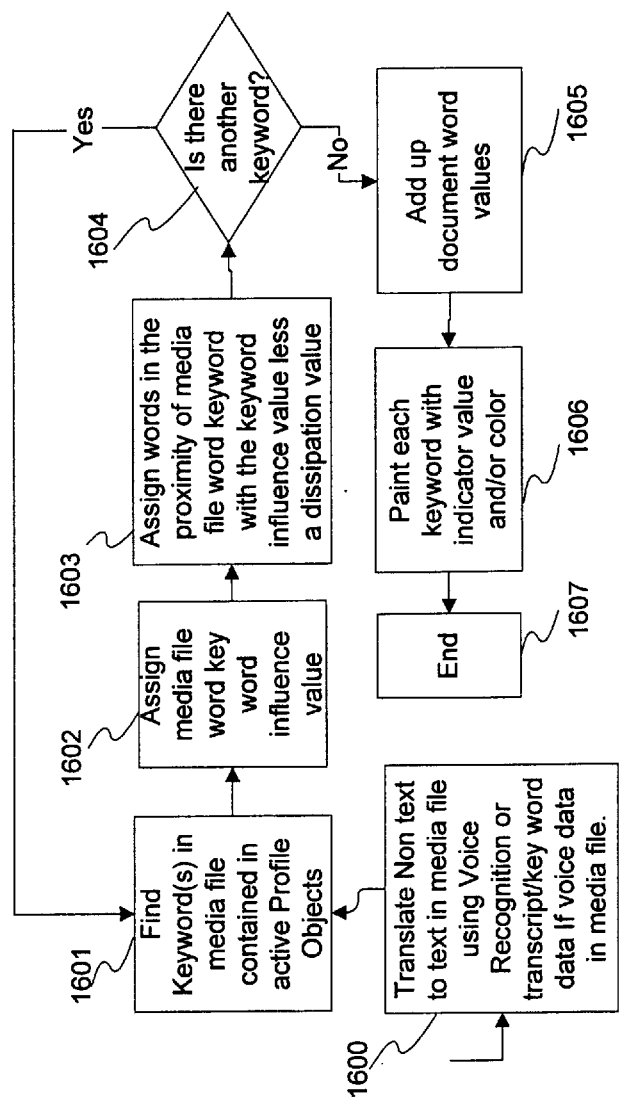
FIG. 16a Illustrates a Key Word Interest Media File Markup method according to the present invention.
Figure 16B:
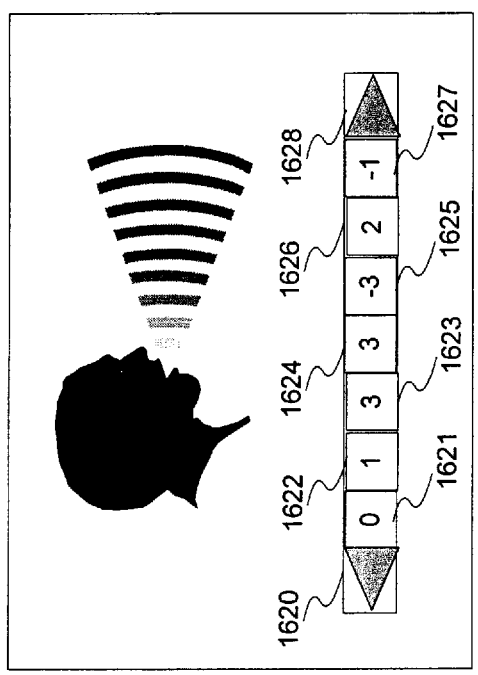
FIG. 16b Illustrates a Key Word Interest Sound File/Video File Markup example according to the present invention.

FIG. 16b illustrates Interest Sound/Video file Markup example. Bars 1621–1627 illustrate the amount of time and/or video in a sound/video file, where each bar represents an amount of the sound/video file. Control arrows 1620 and 1628 allow a user to play a portion of the sound/video media file.

Figure 16C:
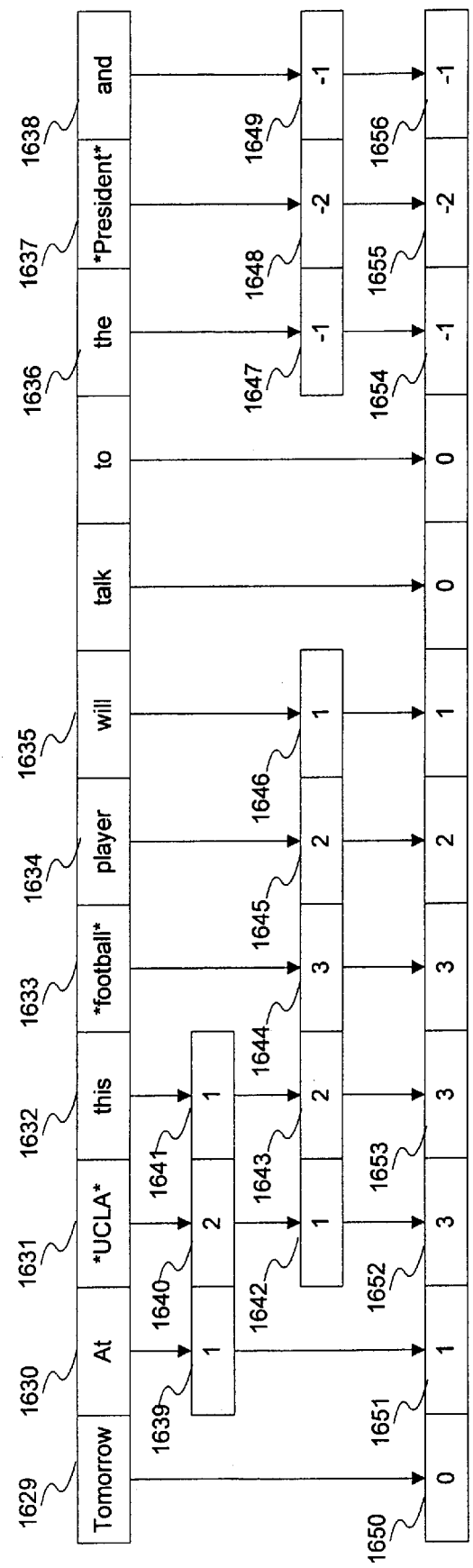
FIG. 16c Illustrates a Key Word Interest Text Media File Markup example according to the present invention.

FIG. 16c is an example of the Key Word Interest Media File Markup example. Words 1629–1638 represent words in a media file that are being examined for active Profile Object key words. In an embodiment, a sound file may be translated to a text file, as illustrated in FIG. 20 and described below. Word 1631 and 1633 illustrate identifying active Profile Object key words having assigned positive values 2 and 3 which are stored in memory location 1640 and 1644, respectively. Identified Key Word 1637 has a negative value of (−2) stored in memory location 1648. Neighboring words 1630 and 1632 are assigned values based upon key word 1631's assigned value and the equation above. Words 1629–1635, and 1636–1638 have similar key word and neighboring values stored in memory locations 1639–1641, 1642–1646 and 1647–1649 as illustrated in FIG. 16c.

Memory location 1650–1656 represents the sum total of the identified assigned key word values and neighboring key word values in the media file. In particular, the values in memory locations 1639–1649 are added based on corresponding word position to obtain the sums in memory locations 1650–1656.

For example, the sum total value of the word "Tomorrow" has a value of 0 in memory location 1650 because there are no key word assigned or neighboring values for "Tomorrow".

The sum total value in memory location 1651 of the Word "At" is 1 because word 1630 is a neighboring key word to the active Profile Object key word "UCLA". The "UCLA" word has a value of (+3) value in memory location 1652 because "UCLA" is a key word and is also a neighboring key word of an active Profile Object (football).

Likewise, the media file may be numerically marked by summarizing identified assigned key word values and neighboring key word values. The numeric values in memory location 1650–1656 correspond to word positions then may be used to color code the media file to identify a user's area of interest and disinterest.

Similarly the time bars in FIG. 16b may also be assigned summed values to identify to a user areas in sound/video file which are of interest or disinterest. For example, time bar 1624 identifies a portion of a sound/video file of interest because of the (+3) value, and time bar 1625 identifies a portion of a sound file of disinterest because of the (−3) value.

In an embodiment, a portion of a sound/video file represented by time bars in FIG. 16b would be evaluated for their key word/key phrase total value using the Media file Key Word Valuation Method illustrated in FIG. 14. Each portion of a sound/video file would be evaluated using the Media File Key Word and Valuation Method. The output of logic block 1317 would then be used to indicate the interest/disinterest of a user corresponding to a portion of the sound/video file.

IX. Profile Object Distance Value Change Based on Media Progression

The interest level a user has regarding a segment of a media file can be determined by the speed and/or rate of media progression or perusal.

Figure 17:
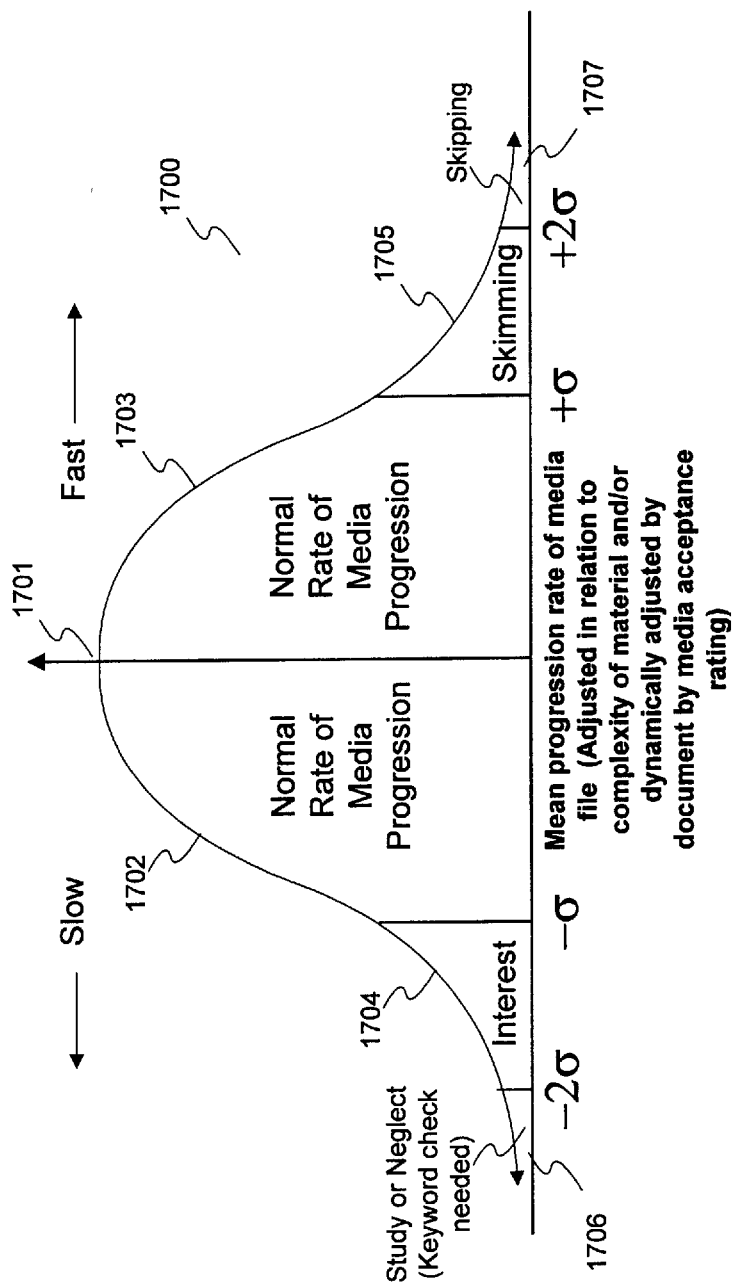
FIG. 17 Illustrates Adjustment Value Change Based on Rate of Media Progression according to the present invention.
Figure 18:
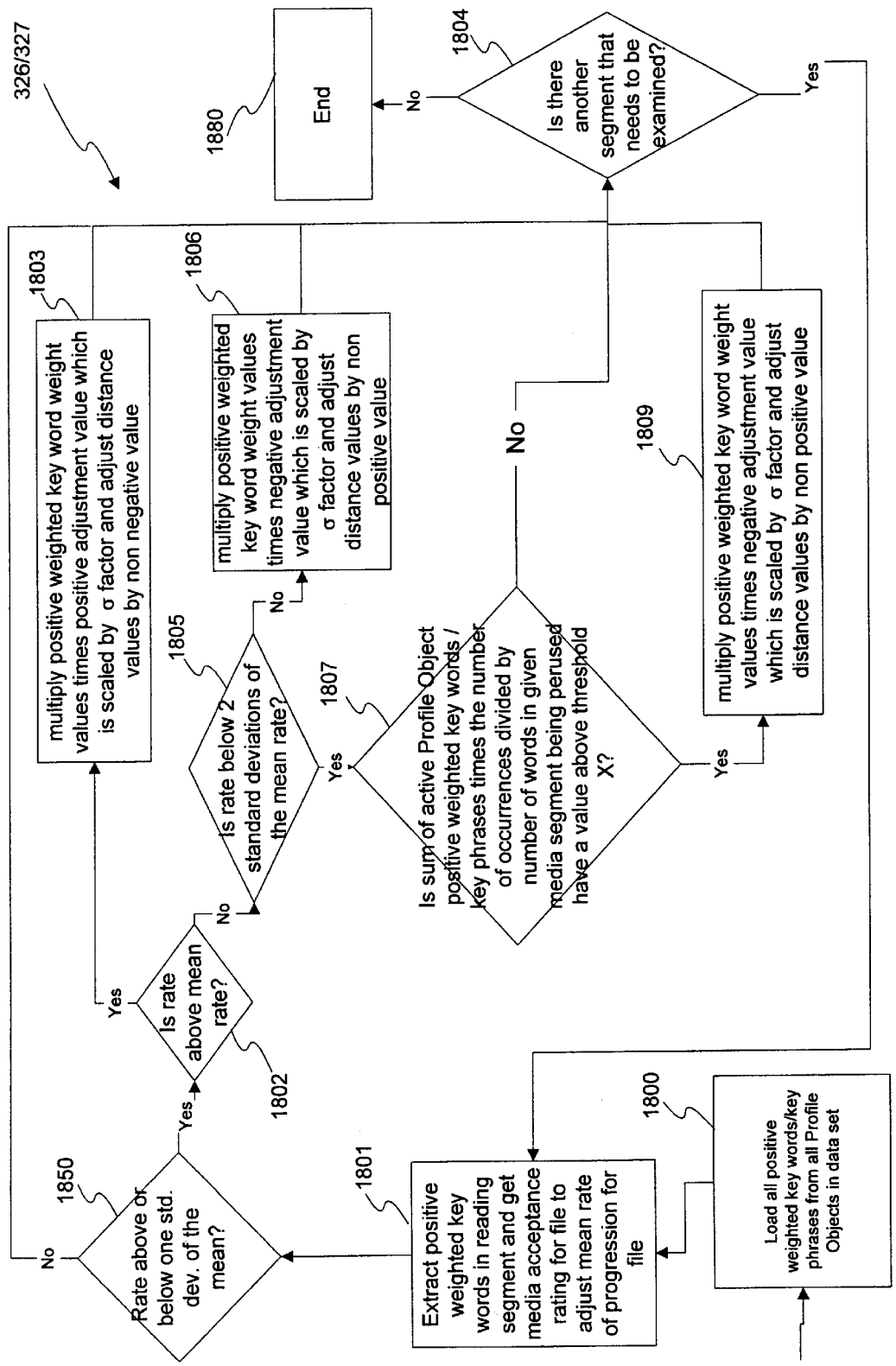
FIG. 18 Illustrates a Profile Object Distance Value Adjustment Based on User's Rate of Media Progression module 326/327 shown in FIG. 3d according to the present invention.

FIGS. 17 and 18 illustrate the Method for changing Profile Object distance values based on rate of media progression, as illustrated in logic block 210 in FIG. 2. FIG. 17 illustrates a bell-shaped curve 1700 which is a normal distribution curve having a mean media progression rate value 1701 adjusted for the current user and the current media file being absorbed by the user. The curve 1700 for a current user is obtained by taking the media acceptance index value, as illustrated in logic block 1206 in FIG. 12, and multiplying it times an associated scaling value to adjust a predetermined standard population reading bell-shaped curve to the current user and current media file.

In an embodiment, the predetermined scaling value will be based on the user's Text Comprehension parameter.

In another embodiment, curve 1700 will be derived from measured reading rates for the user on a previously accessed media file with similar media acceptance index values, as illustrated in FIG. 11.

In the current example, the rate of media progression for a standard media segment assumes an approximate normal distribution. While in this example a standard distribution is used, the same statistical techniques could be applied to any distribution that is obtained. As one skilled in the art would know, simple statistical tests would detect and negate the use of extremely skewed distributions.

A media rate of progression value for a media file can be obtained by measuring the rate of cursor movement or scroll bar movement down the selected media file. For example, media rate of progression may equal the number of scrolled pages per minute. The media file is also presented to a user with a predetermined font and page size and review screen resolution in order to obtain accurate measurements.

Also, eye-tracking information from eye-tracking device 103 can be used as well to determine in particular, the speed of reading the media file. In an embodiment, pupil dilation information and head position orientation values can be used to adjust the media rate of progression value illustrated in FIG. 17.

In this example, there are several regions that are demarcated by standard deviation measurements on the bell-shaped curve 1700. The region up to one standard deviation above the mean 1701 is represented by region 1703 and the region one standard deviation ($\sigma$) below the mean 1701 is represented by region 1702. The region between one standard deviation ($\sigma$) and two standard deviations above and below mean 1701 is represented by regions 1705 and 1704, respectively. The region above two standard deviations above mean 1701 is region 1707 and the region two standard deviations below mean 1701 is region 1706.

The curve represents possible rates of media progression by a user. The media progression rate of the selected media file is used to determine the degree of interest a user has in a media file. Regions 1702, 1703, 1704, 1705, 1706, and 1707 designate media progression rate ranges and are used to assign scaling factors used to change the Distance values and Activation values in Profile Objects.

If a media progression rate value falls in region 1703 or 1702, the reader is probably reading the material. Thus, that portion of the media file is probably within normal interest of the user.

If a media progression rate value falls in the region 1705, the reader is most likely skimming this portion of the media file. Thus, this portion of the media file is most likely not of significant interest to the user.

If a media progression rate value falls in region 1707, the reader appears to be skipping over this portion of the media file. Thus, this portion of the media file is not of interest to the user.

If a media progression rate value falls in region 1704, the user is most likely reading this portion of the media file very carefully. Thus, this portion of the media file is probably of great interest to the user.

If a media progression rate value falls in region 1706, the user is either studying the material very carefully or is neglecting the material.

FIG. 18 illustrates a Method of Adjusting Profile Object Distance values based on rate of media progression values, as shown by logic block 210 in FIG. 2. Logic block 1800 loads all positive weighted key words/key phrases from all Profile Objects in a Personal Profile database 107 data set (both active and inactive Profile Objects). Logic block 1801 then loads the media file acceptance rating to adjust the mean rate of progression for the file and then searches through the media file segment to locate corresponding positive weighted key words/key phrases. Logic block 1850 determines if the media file is being absorbed within the normal rate of progression by determining if the rate of progression is within one standard deviation of the mean reading speed 1701. If yes, control is transferred to logic block 1802. If no, control is transferred to logic block 1804. Logic block 1802 determines if the selected media file is being skimmed or skipped by determining if the media progression rate value is above the mean reading speed 1701, as illustrated in FIG. 17. If yes, control is transferred to logic block 1803. If no, control is transferred to logic block 1805.

Logic block 1803 adjusts the Distance value for the associated Profile Objects of positive weighted key word/ key phrases found in the media file segment by a non-negative value. The positive weighted key word/key phrase weight values for a Profile Object are summed and multiplied by a scaling function related to the current measured media progression value. For example, if two key words, Sports (+3) and Athletes (+2) in a football profile as seen in FIG. 7b were found in a media file which is being skipped, the key word values (+3) and (+2) would be summed and multiplied by+2 as follows: ((3+2)×2=10). The (+2) value corresponds to a media progression value of two standard deviations from the mean. In an embodiment, the value 10 would then would be scaled by (0.1) to adjust the Distance value by (+1) in the Profile Object to a new distance value. Thus, the media progression rate would have the effect of moving the football Profile Object further from the Self Object and therefore have less impact in selecting further media files. Control is then transferred to logic block 1804.

Logic block 1805 determines if the selected media file is in the studied or neglected region 1706 if the rate of media progression is equal to or less than 2 standard deviations below the mean reading speed 1701. If yes, control is transferred to logic block 1807. If no, then control is transferred to logic block 1806.

Logic block 1806 then adjusted the Distance values for the associated Profile Objects of positive weighted key words/key phrases found in the media file segment by a non-positive value. The positive weighted key word/key phrase weight values for a Profile Object are summed and multiplied by a number corresponding to the current measured media progression rate. This number would be negative, unlike the positive number used in logic block 1803. The value is then used to adjust the Distance values of the Profile Objects. Since this value is negative, the Profile Object would be moved closer to the Self Object, causing the Profile Object to have more impact in rating media files.

Logic block 1807 determines whether or not the user is studying ia or neglecting the media file by analyzing the media file for active Profile Object positive weighted key word/key phrases in a Personal Profile Database 107 data set. The found positive key word weight values are then summed and divided by the number of words in the media segment. If the summed value is above a predetermined threshold value, control is transferred to logic block 1809. Otherwise, a determination is made that the user is neglecting the media file and nothing is done to Profile Objects by transferring control to logic block 1804.

If the summed value exceeds the threshold, a determination is made that the user is studying the media file. Logic block 1809 then adjusts the Distance value for associated Profile Objects of positive weighted key words/key phrases found in the media file segment by a non positive value. The key word/key phrase weight values for a Profile Object are summed and multiplied by a number corresponding to the current measured media progression rate. This number would be a negative value, thereby moving the Profile Object closer to the Self Object.

Logic block 1804 determines if there is another segment to be examined, if yes control is transferred to logic block 1801. If no, control is transferred to logic bock 1880 where the function ends.

Figure 19:
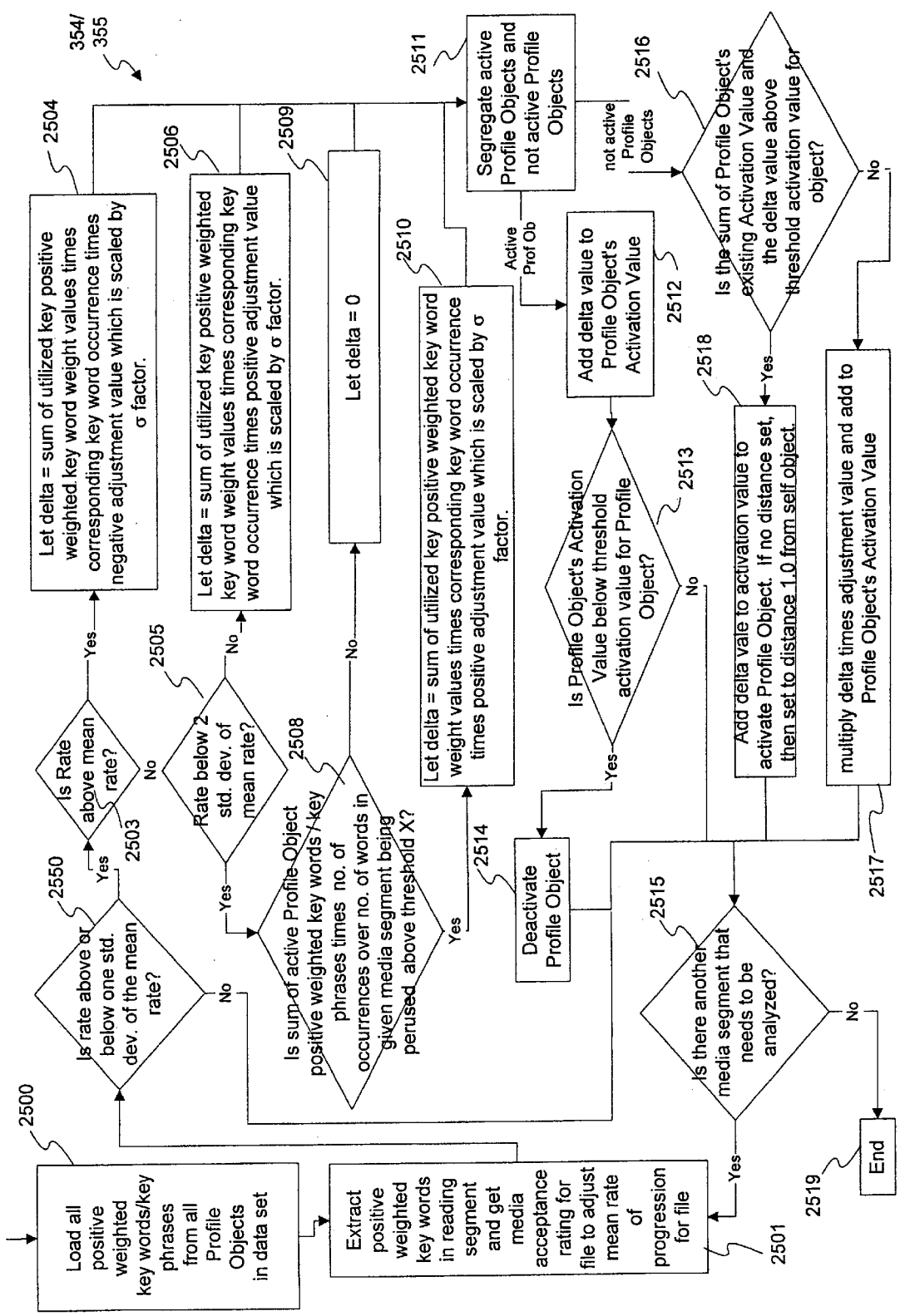
FIG. 19 Illustrates a Profile Object Activation Value Adjustment Based on Rate of Media Progression module 354/355 shown in FIG. 3e according to the present invention.

X. Profile Object Activation Value Adjustment Based on Rate of Media Progression FIG. 19 illustrates adjusting activation values for Profile Objects based on rate of media progression as shown in logic block 215 in FIG. 2.

Logic block 2500 loads all positive weighted key words/key phrases from all Profile Objects in Personal Profile Database 107 data set (both active or inactive Profile Objects) and transfers control to logic block 2501. Logic block 2501 extracts positive weighted key words in a media file segment being absorbed and retrieves a media file acceptance rating for the file to adjust the mean rate of progression 1701. The media file acceptance value is used, as above, to adjust a predetermined normal distribution media progression curve to obtain a curve, as illustrated in FIG. 17. Control is then transferred to logic block 2550.

Logic block 2550 determines if the media file being absorbed is above or below one standard deviation of the mean rate of progression 1701. If no, control is transferred to logic block 2515. If yes, control is transferred to logic block 2503.

In logic block 2503, a determination is made whether or not the reader is skipping by determining if the rate of progression is above the mean rate of progression 1701. If yes, control is transferred to logic block 2504. If no, then control is transferred to logic block 2505.

Logic block 2504 calculates a non-positive Delta value associated with each active or inactive Profile Object having positive weighted key words identified in the media file. The Delta value is calculated by summing the positive weighted key word weights in the Profile Object times the number of instances the key words occur in the media file segment. This sum is then multiplied by a negative adjustment value scaled by the measured user media progression rate value.

Logic block 2505 determines whether or not the user is studying the media or neglecting the media file segment by determining if the rate of progression is equal to or less than 2 standard deviations below the mean rate of progression 1701. If yes, control is transferred to logic block 2508. If no, then control is transferred to logic block 2506.

Logic block 2506 creates a non-negative Delta value associated with each active or inactive Profile Object having positive weighted key words identified in the media file. The Delta value is calculated by summing the positive weighted key word/key phrase weights found in the Profile Object times the number of instances the positive weighted key words/key phrases occur within a media file segment. This sum is then multiplied by a positive adjustment value scaled by the corresponding measured user media progression rate value.

In logic block 2508, a determination is made whether or not the user is studying or neglecting the media file by analyzing the media file for active Profile Object positive weighted key word and key phrases. The found positive key word weight values are then summed and divided by the number of words in the media segment. If the summed value is above a predetermined threshold value, control is transferred to logic block 2510. Otherwise, a determination is made that the user is neglecting the media file and nothing is done to Profile Object(s) by transferring control to logic block 2509.

Logic block 2509 sets the Delta value equal to zero, thereby causing no change in Profile Object activation values.

Logic block 2510 creates a non-negative Delta value that is the sum of found positive key word/key phrase weights in a Profile Object times the number of instances the positive weighted key words occur in the media file segment. This sum is then multiplied by a positive adjustment value scaled by the corresponding measured user media progression rate value.

Logic block 2511 segregates active Profile Objects from inactive Profile Objects by transferring active Profile Objects to logic block 2512 and transferring inactive Profile Objects to logic block 2516.

In logic block 2512, the Delta values associated with each Profile Object are added to the corresponding active Profile Objects' Activation values. In logic block 2513, a determination whether or not the Profile Object's Activation value is below the Profile Object's Threshold Activation value is made. If yes, control is transferred to logic block 2514. If no, then control is transferred to logic block 2515.

In logic block 2514, an active Profile Object is deactivated and control is transferred to logic block 2515.

In logic block 2516, a determination is made whether the sum of a Profile Object's Activation value and the corresponding Delta value is greater than the inactive Profile Object's Threshold Activation value. If yes, control is transferred to logic block 2518. If no, then control is transferred to logic block 2517.

In logic block 2518, the Profile Object is activated by adding the corresponding Delta value. Thus the Activation value now exceeds the Activation Threshold value. If the Profile Object doesn't have a Distance value, then distance value is set to 1.0 from Self Object. Control is then transferred to logic block 2515.

In logic block 2517, the associated Delta value is multiplied by a predetermined adjustment value and the product is added to Profile Object's Activation value. Control is then transferred to logic block 2515.

In logic block 2515, a determination is made whether or not there is another media segment that needs to be analyzed. If yes, control is transferred to logic block 2501. If no, control is transferred to logic block 2519 where the method ends.

In an embodiment, all profile object Activation values decay over time and/or have positive and negative limits.

In another embodiment, Profile Objects Activation values decay if Profile Object key words/key phrase are not found in a media file during a period of time.

In an embodiment, Profile Objects may be deactivated if the Profile Object reaches a predetermined distance away from the User Object.

XI. Media File to Text File

FIG. 20 illustrates a method for translating a media file, such as a sound file, to a text file. In an embodiment, the method is used in logic block 1302, as illustrated in FIG. 13, logic block 1202, as illustrated in FIG. 12 and logic block 1600, as illustrated in FIG. 16a.

Logic block 2001 loads a media file into memory and then transfers control to logic block 2002 where a determination is made whether the media file contains sound. If yes, control is transferred to logic block 2004. If no, control is transferred to logic block 2050 where the method ends.

Logic block 2004 makes a determination if there is a text file containing a transcript or key words of the voice data associated with the sound file. If yes, control is transferred to logic block 2005. If no, control is transferred to logic block 2006.

Logic block 2005 opens the text file containing the transcript or key words of the media file and uses this data for media evaluation of the media file containing sound. Control then transfers to logic block 2050 where the method ends.

Logic block 2006 activates voice recognition software 155, as seen in FIG. 1. Logic block 2007 then loads a voice recognition vocabulary into RAM 106 and then transfers control to logic block 2008.

Logic block 2008 determines if the user has set time splicing to be used in voice-to-text translation. If yes control is transferred to logic block 2012. If no, control is transferred to logic block 2009. Time splicing generates sound pauses between predetermined points of a sound track played in a media file to facilitate voice recognition. The splicing is used in order to obtain possible utterances.

Logic block 2009 plays a sound file on sound card 150, as shown in FIG. 1. The output of sound card 150 (voice/analog signal) is then inputted to sound card 151 on line 152. In logic block 2010, sound card 151 generates a digital signal representing utterances or voice segments. Voice recognition software 155 then translates the utterances (voice segment) to a phrase or word in a text file using a voice recognition vocabulary. Voice recognition software 155 may include an active speech and language model.

Logic block 2011 saves the text file and transfers control to logic block 2050 where the method ends.

Logic block 2012 sets the number of recognition attempts variable for the media file to 0 and transfers control to logic block 2013. The recognition attempts variable is used to control the number of times voice recognition software 155 attempts to translate the sound file to text.

Logic block 2013 sets the time splice variable to a predetermined value and transfers control to logic block 2014 where the sound file is played on sound card 150 with time slices or pauses between utterances or sound segments. Thus, sound card 151 receives an analog voice signal with predetermined pauses.

Logic block 2015 uses sound card 151, as in logic block 2010, to generate digitalized signals representing utterances. Voice recognition software 155 then attempts to translate the utterances to an appropriate phrase or word in a text file using a voice recognition vocabulary.

A recognition ratio value is determined in logic block 2016. The recognition ratio value is the number of utterances recognized by voice recognition software 155, divided by the number of time slices used in the sound file. The recognition ratio value is used to indicate how successful voice recognition software 155 and splicing is in translating the sound file splices to text. Control is then transferred to logic block 2017.

Logic block 2017 increments the recognition attempt variable by 1, indicating the number of times the sound file has been analyzed by voice recognition software 155. Logic block 2019 determines if the recognition attempts variable is above a threshold. If yes, control is transferred to logic block 2018. If no, control is transferred to logic block 2020.

Logic block 2018 saves the text file with the greatest recognition ratio and deletes the others and transfers control to logic block 2050 where the method ends.

Logic block 2020 makes a determination if the recognition ratio value is above a threshold value. If yes, control is transferred to logic block 2018. If no, control is transferred to logic block 2021.

Logic block 2021 obtains another time slice value by random number generation or from RAM 106 and transfers control to logic block 2014.

In an embodiment, time splicing is not used and logic block 2008 and 2012–2021 are not used.

In another embodiment, pauses and/or time slices used in a sound file may be created or increased based on volume changes. This increases the effectiveness of voice recognition software 155.

In an embodiment, voice recognition software is DragonDictate® for Windows 2.5 and DragonXTool™ Custom Controls for Windows, which is available from Dragon Systems, Inc., located at 320 Nevada Street, Newton, Mass. 02160. The Dragon Dictate® User's Guide, DragonXTool™ Guide and Reference, Dragon Dictate® Macro Language Guide and Reference and DragonVoiceTools Programmer's Guide are all incorporated by reference.

In an embodiment, DragonDictate® is running under a Windows operating system, along with personal feedback browser 108. Personal feedback browser 108 contains DragonXTools commands which link personal feedback browser 108 to a DragonDictate® speech recognition engine and vocabulary.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus for obtaining information from a computer, comprising:
   (a) means for presenting data to a user;
   (b) input means for supplying input data in response to a user's input;
   (c) memory, coupled to the means for presenting and input means, for storing a personal feedback browser and a personal profile database;
   (d) a processor, coupled to the means for presenting, the input means and memory, for controlling the memory, input means, and the means for presenting, in response to the stored personal feedback browser and personal profile database and input data to retrieve information from the computer;
      wherein the personal feedback browser provides a media file to the means for presenting based on the personal profile database;

(e) wherein the personal feedback browser includes;
a profile builder software program for obtaining and storing personal profile data in the personal profile database; and,
wherein the profile builder software program uses of at least one question to adjust at least one parameter value in a profile object.

2. A data processing apparatus for obtaining information from a computer, comprising:
(a) means for presenting data to a user;
(b) input means for supplying input data in response to a user's input;
(c) memory, coupled to the means for presenting and input means, for storing a personal feedback browser and a personal profile database;
(d) a processor, coupled to the means for presenting, the input means and memory, for controlling the memory, input means, and the means for presenting, in response to the stored personal feedback browser and personal profile database and input data to retrieve information from the computer;
wherein the personal feedback browser provides a media file to the means for presenting based on the personal profile database;
(e) wherein the personal feedback browser includes;
a media evaluation software program for evaluating the media file obtained from the computer based upon the personal profile database; and,
(f) wherein the media evaluation software program includes:
a sound file to text file software program for translating a sound file into a text file.

3. A data processing apparatus for obtaining information from a computer, comprising:
(a) means for presenting data to a user;
(b) input means for supplying input data in response to a user's input;
(c) memory, coupled to the means for presenting and input means, for storing a personal feedback browser and a personal profile database;
(d) a processor, coupled to the means for presenting, the input means and memory, for controlling the memory, input means, and the means for presenting, in response to the stored personal feedback browser and personal profile database and input data to retrieve information from the computer;
wherein the personal feedback browser provides a media file to the means for presenting based on the personal profile database;
(e) wherein the personal feedback browser includes;
a media evaluation software program for evaluating the media file obtained from the computer based upon the personal profile database; and,
(f) wherein the media evaluation software program includes;
a sound file to text file software program for translating a sound file into a text file, wherein the sound file includes a sound utterance which is translated into a key word.

4. A data processing apparatus for obtaining information from a computer, comprising:
(a) means for presenting data to a user;
(b) input means for supplying input data in response to a user's input;

(c) memory, coupled to the means for presenting and input means, for storing a personal feedback browser and a personal profile database;
(d) a processor, coupled to the means for presenting, the input means and memory, for controlling the memory, input means, and the means for presenting, in response to the stored personal feedback browser and personal profile database and input data to retrieve information from the computer:
wherein the personal feedback browser provides a media file to the means for presenting based on the personal profile database:
(e) wherein the personal feedback browser includes;
a media evaluation software program for evaluating the media file obtained from the computer based upon the personal profile database: and,
(f) wherein the media evaluation software program includes;
a sound file to text file software program for translating a sound file into a text file;
(g) wherein the personal feedback browser includes:
an adaptive software for modifying a personal profile database in response to a user's absorption of the media file.

5. A data processing apparatus for obtaining information from a computer, comprising:
(a) means for presenting data to a user;
(b) input means for supplying input data in response to a user's input;
(c) memory, coupled to the means for presenting and input means, for storing a personal feedback browser and a personal profile database;
(d) a processor, coupled to the means for presenting, the input means and memory, for controlling the memory, input means, and the means for presenting, in response to the stored personal feedback browser and personal profile database and input data to retrieve information from the computer;
wherein the personal feedback browser provides a media file to the means for presenting based on the personal profile database;
(e) wherein the personal feedback browser includes;
an adaptive software for modifying a personal profile database in response to a user's absorption of the media file; and,
wherein the user's absorption of the media file is based on a media progression rate value.

6. A data processing apparatus for obtaining information from a computer, comprising:
(a) means for presenting data to a user;
(b) input means for supplying input data in response to a user's input;
(c) memory, coupled to the means for presenting and input means, for storing a personal feedback browser and a personal profile database;
(d) a processor, coupled to the means for presenting, the input means and memory, for controlling the memory, input means, and the means for presenting, in response to the stored personal feedback browser and personal profile database and input data to retrieve information from the computer;
wherein the personal feedback browser provides a media file to the means for presenting based on the personal profile database;

(e) wherein the personal feedback browser includes;
   an adaptive software for modifying a personal profile database in response to a user's absorption of the media file; and,
   wherein the user's absorption of the media file is based on a media progression rate value; and
(f) a biometric device, coupled to the processor, for adjusting the media progression rate value.

7. A data processing apparatus for obtaining information from a computer, comprising:
   (a) means for presenting data to a user;
   (b) input means for supplying input data in response to a user's input;
   (c) memory, coupled to the means for presenting and input means, for storing a personal feedback browser and a personal profile database;
   (d) a processor, coupled to the means for presenting, the input means and memory, for controlling the memory, input means, and the means for presenting, in response to the stored personal feedback browser and personal profile database and input data to retrieve information from the computer;
      wherein the personal feedback browser provides a media file to the means for presenting based on the personal profile database;
   (e) wherein the personal feedback browser includes:
      a profile builder software program for obtaining and storing personal profile data in the personal profile database; and,
   (f) wherein the profile builder software program includes:
      a software program for providing a profile object and a self object, wherein a profile object's distance from a self object is adjustable by a user.

8. A data processing apparatus for obtaining information from a computer, comprising:
   (a) means for presenting data to a user;
   (b) input means for supplying input data in response to a user's input;
   (c) memory, coupled to the means for presenting and input means, for storing a personal feedback browser and a personal profile database;
   (d) a processor, coupled to the means for presenting, the input means and memory, for controlling the memory, input means, and the means for presenting, in response to the stored personal feedback browser and personal profile database and input data to retrieve information from the computer;
      wherein the personal feedback browser provides a media file to the
      means for presenting based on the personal profile database: and, wherein the personal profile database includes an identity/interest profile object which has at least one key word with an assigned weight value.

9. A data processing apparatus for obtaining information from a computer, comprising:
   (a) means for presenting data to a user:
   (b) input means for supplying input data in response to a user's input:
   (c) memory, coupled to the means for presenting and input means, for storing a personal feedback browser and a personal profile database;
   (d) a processor, coupled to the means for presenting, the input means and memory, for controlling the memory input means, and the means for presenting, in response to the stored personal feedback browser and personal profile database and input data to retrieve information from the computer;
      wherein the personal feedback browser provides a media file to the means for presenting based on the personal profile database; and,
      wherein the personal profile database includes a hero profile object which has at least one key word with an assigned weight value.

10. A data processing apparatus for obtaining information from a computer, comprising:
    (a) means for presenting data to a user;
    (b) input means for supplying input data in response to a user's input;
    (c) memory, coupled to the means for presenting and input means, for storing a personal feedback browser and a personal profile database;
    (d) a processor, coupled to the means for presenting, the input means and memory, for controlling the memory, input means, and the means for presenting, in response to the stored personal feedback browser and personal profile database and input data to retrieve information from the computer;
       wherein the personal feedback browser provides a media file to the means for presenting based on the personal profile database; and,
       wherein the personal profile database includes a descriptor profile object which has at least one key word with an assigned weight value.

11. A data processing apparatus for obtaining information from a computer, comprising:
    (a) means for presenting data to a user;
    (b) input means for supplying input data in response to a user's input;
    (c) memory, coupled to the means for presenting and input means, for storing a personal feedback browser and a personal profile database;
    (d) a processor, coupled to the means for presenting, the input means and memory, for controlling the memory input means, and the means for presenting, in response to the stored personal feedback browser and personal profile database and input data to retrieve information from the computer;
       wherein the personal feedback browser provides a media file to the means for presenting based on the personal profile database; and,
    (e) wherein the personal profile database includes an attitude/aptitude profile object which has at least one key word with an assigned weight value.

12. A data processing apparatus for obtaining information from a computer, comprising:
    (a) means for presenting data to a user;
    (b) input means for supplying inout data in response to a user's input;
    (c) memory, coupled to the means for presenting and input means, for storing a personal feedback browser and a personal profile database;
    (d) a processor, coupled to the means for presenting, the input means and memory, for controlling the memory, input means, and the means for presenting, in response to the stored personal feedback browser and personal profile database and input data to retrieve information from the computer;
       wherein the personal feedback browser provides a media file to the means for presenting based on the personal profile database;

(e) wherein the personal feedback browser includes;
   a profile builder software program for obtaining and storing personal profile data in the personal profile database; and,
(f) wherein the profile builder further includes:
   a software program for determining a text media comprehension parameter for a user.

13. A data processing apparatus for obtaining information from a computer, comprising:
   (a) means for presenting data to a user;
   (b) input means for supplying input data in response to a user's input;
   (c) memory, coupled to the means for presenting and input means, for storing a personal feedback browser and a personal profile database;
   (d) a processor, coupled to the means for presenting, the input means and memory, for controlling the memory, input means, and the means for presenting, in response to the stored personal feedback browser and personal profile database and input data to retrieve information from the computer;
      wherein the personal feedback browser provides a media file to the means for presenting based on the personal profile database;
   (e) wherein the personal feedback browser includes:
      a media evaluation software program for evaluating the media file obtained from the computer based upon the Personal profile database; and,
   (f) wherein the media evaluation software program includes:
      a software program for extracting positive and negative assigned key words from 1) a user's personal profile database and 2) a media file in order to create a corresponding media file index value.

14. A data processing apparatus for obtaining information from a computer, comprising:
   (a) means for presenting data to a user;
   (b) input means for supplying input data in response to a user's input;
   (c) memory, coupled to the means for presenting and input means, for storing a personal feedback browser and a personal profile database;
   (d) a processor, coupled to the means for presenting, the input means and memory, for controlling the memory, input means, and the means for presenting, in response to the stored personal feedback browser and personal profile database and input data to retrieve information from the computer;
      wherein the personal feedback browser provides a media file to the means for presenting based on the personal profile database:
   (e) wherein the personal feedback browser includes:
      a media evaluation software program for evaluating the media file obtained from the computer based upon the personal profile database;
   (f) wherein the media evaluation software program includes:
      a software program for obtaining a text comprehension parameter for the media file;
      a software program for obtaining a text comprehension parameter for a user; and,
      a software program for obtaining a comprehension index value based on the media file's text comprehension parameter and the user's text comprehension parameter.

15. A data processing apparatus for obtaining information from a computer, comprising:
   (a) means for presenting data to a user;
   (b) input means for supplying input data in response to a user's input;
   (c) memory, coupled to the means for presenting and input means, for storing a personal feedback browser and a personal profile database;
   (d) a processor, coupled to the means for presenting, the input means and memory, for controlling the memory, input means, and the means for presenting, in response to the stored personal feedback browser and personal profile database and input data to retrieve information from the computer;
      wherein the personal feedback browser provides a media file to the means for presenting based on the personal profile database; and,
   (e) wherein the personal feedback browser includes:
      a mark-up software program for differentiating sections of a media file in response to summing a plurality of key words assigned values in the media file.

16. An article of manufacture, including computer readable medium having computer readable program code means embodied therein for obtaining a media file from a computer, comprising:
   (a) computer-readable program code means for building a personal profile database responsive to a users input;
   (b) computer-readable program code means for evaluating a media file obtained from the computer based upon the personal profile database;
   (c) computer-readable program code means for adjusting the personal profile database responsive to a user selection of the media file; and,
   (d) computer-readable program code means for adjusting the personal profile database in response to a user's absorption of the media file.

17. The article of manufacture of claim 16, wherein the computer-readable program code means for building a personal profile database includes:
   (a) computer-readable program code means for providing a profile object and a self object; and,
   (b) computer-readable program code means for adjusting a parameter in a profile object in response to a user's positioning of a profile object relative to the self object.

18. The article of manufacture of claim 16, wherein the computer-readable program code means further includes:
   (a) computer-readable program code means for determine a text media comprehension parameter for the user.

19. The article of manufacture of claim 16, wherein the computer-readable program code means for evaluating a media file includes:
   (a) computer-readable program code means for obtaining a key word having an associated weight value from the personal profile database;
   (b) computer-readable program code means for identifying the key word in a media file;
   (c) computer-readable program code means for multiplying an occurrence of the key word in the media file by the associated key word weight value in order to obtain a product; and,
   (d) computer-readable program code means for summing the products in order to provide a media indication value.

20. A method for obtaining a media file from a computer, the method comprising the steps of:

(a) building a personal profile database containing user-specific information;

(b) retrieving a plurality of media files from the computer;

(c) evaluating the plurality of media files obtained from the computer responsive to the personal profile database;

(d) adjusting the user's personal profile database in response to a selection of a media file from the plurality of media files obtained from the computer; and, (e) adjusting the personal profile database based on a user's absorption of the media file obtained from the computer.

21. The method of claim 20, wherein the step of building a personal profile database includes the steps of:

(a) selecting a profile object; and, (b) adjusting at least one parameter of the profile object.

22. The method of claim 20, wherein the building personal profile database includes the step of:

(a) obtaining a user text media comprehension parameter.

23. A data processing apparatus for obtaining information from a computer, comprising:

(a) means for presenting data to a user;

(b) input means for supplying input data in response to a user's input;

(c) memory, coupled to means for presenting and input means, for storing a personal feedback browser and a personal profile database, wherein the personal profile database includes at least one key word having at least one numeric value, wherein the numeric value is a negative numbers; and, (d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database.

24. A data processing apparatus for obtaining information from a computer, comprising:

(a) means for presenting data to a user;

(b) input means for supplying input data in response to a user's input;

(c) memory, coupled to means for presenting and input means, for storing a personal feedback browser and a personal profile database, wherein the personal profile database includes at least one key word having at least one numeric value; and, (d) a processor, coupled to the means for presenting the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(e) wherein the personal feedback browser includes an adaptive software for modifying a personal profile database in response to a user's absorption of the media file, wherein the user's absorption of the media file is determined by a rate of progression.

25. A data processing apparatus for obtaining information from a computer, comprising;

(a) means for presenting data to a user;

(b) input means for supplying input data in response to a user's input;

(c) memory, coupled to means for presenting and input means, for storing a personal feedback browser and a personal profile database, wherein the personal profile database includes at least one key word having at least one numeric value; and, (d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(e) wherein the personal feedback browser includes an adaptive software for modifying a personal profile database in response to a user's absorption of the media file, wherein the user's absorption of the media file is determined by a rate of progression, wherein the user's absorption of the media file is based on the rate of media progression in relation to a statistical function.

26. A data processing apparatus for obtaining information from a computer, comprising;

(a) means for presenting data to a user:

(b) input means for supplying input data in response to a user's input;

(c) memory, coupled to means for presenting and input means, for storing a personal feedback browser and a personal profile database, wherein the personal profile database includes at least one key word having at least one numeric value; and, (d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(e) wherein the personal feedback browser includes an adaptive software for modifying a personal profile database in response to a user's absorption of the media file; wherein the user's absorption of the media file is based on the rate of media progression in relation to a statistical function; wherein the statistical function is a statistical distribution function.

27. A data processing apparatus for obtaining information from a computer, comprising:

(a) means for presenting data to a user;

(b) input means for supplying input data in response to a user's input;

(c) memory, coupled to means for presenting and input means, for storing a personal feedback browser and a personal profile database, wherein the personal profile database includes at least one key word having at least one numeric value; and, (d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(e) wherein the personal feedback browser includes an adaptive software for modifying a personal profile database in response to a user's absorption of the media file;

wherein the user's absorption of the media file is based on the rate of media progression in relation to a statistical function; wherein the statistical function is a statistical distribution function; wherein the statistical distribution function includes a mean which is adjustable.

28. A data processing apparatus for obtaining information from a computer, comprising:

(a) means for presenting data to a user;

(b) input means for supplying input data in response to a user's input;

(c) memory, coupled to means for presenting and input means, for storing a personal feedback browser and a personal profile database, wherein the personal profile database includes at least one key word having at least one numeric value; and, (d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database:

(e) wherein the personal feedback browser includes an adaptive software for modifying a personal profile database in response to a user's absorption of the media file;

wherein the user's absorption of the media file is based on the rate of media progression in relation to a statistical function: wherein the statistical function is a statistical distribution function; wherein the statistical distribution function has a region identifying a user's interest.

29. A data processing apparatus for obtaining information from a computer, comprising:

(a) means for presenting data to a user;

(b) input means for supplying input data in response to a user's input;

(c) memory, coupled to means for presenting and input means, for storing a personal feedback browser and a personal profile database, wherein the personal profile database includes at least one key word having at least one numeric value; and, (d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(e) wherein the personal feedback browser includes an adaptive software for modifying a personal profile database in response to a user's absorption of the media file;

wherein the user's absorption of the media file is based on the rate of media progression in relation to a statistical function; wherein the statistical function is a statistical distribution function; wherein the statistical distribution function has a region identifying a user's disinterest.

30. A data processing apparatus for obtaining information from a computer, comprising:

(a) means for providing data to a user;

(b) input means for supplying input data in response to a user's input;

(c) memory, coupled to the means for presenting and input means, for storing a personal feedback browser and a personal profile database;

(d) a biometric device for obtaining a user's response value to a media file;

(e) a processor, coupled to the means for presenting, the input means, the biometric device, and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(f) wherein the personal feedback browser includes;

an adaptive software for modifying the personal profile database in response to the user's response value wherein the user's response value is a media progression rate value.

31. The article of manufacture of claim 16, wherein the user interaction with the media file includes a user's selection of the media file.

32. A data processing apparatus for obtaining information from a computer, comprising:

(a) means for presenting data to a user;

(b) input means for supplying input data in response to a user's input;

(c) memory, coupled to the means for presenting and input means, for storing a personal feedback browser and a personal profile database;

(d) a processor, coupled to the means for presenting, the input means and memory, for controlling the memory, input means, and the means for presenting, in response to the stored personal feedback browser and personal profile database and input data to retrieve information from the computer;

wherein the personal feedback browser provides a media file to the means for presenting based on the personal profile database;

(e) wherein the personal feedback browser includes:

a profile builder software program for obtaining and storing personal profile data in the personal profile database; and, (f) wherein the profile builder software program includes:

a software program for providing a profile object and a self object, wherein the user is able to adjust the influence of the profile object.

33. The apparatus of claim 1, wherein the computer is in a network.

34. The apparatus of claim 2, wherein the computer is in a network.

35. The apparatus of claim 5, wherein the computer is in a network.

36. The apparatus of claim 7 wherein the computer is in a network.

37. The apparatus of claim 8 wherein the computer is in a network.

38. The apparatus of claim 9 wherein the computer is in a network.

39. The apparatus of claim 10 wherein the computer is in a network.

40. The apparatus of claim 11 wherein the computer is in a network.

41. The apparatus of claim 12 wherein the computer is in a network.

42. The apparatus of claim 13 wherein the computer is in a network.

43. The apparatus of claim 14 wherein the computer is in a network.

44. The apparatus of claim 15 wherein the computer is in a network.

45. The article of manufacture of claim 16 wherein the computer is in the internet.

46. The article of manufacture of claim 19, wherein the computer is in the internet.

47. The apparatus of claim 32, wherein the computer is in a network.

48. An article of manufacture, including computer readable medium having computer readable program code means embodied therein for obtaining a media file from a computer, comprising:

(a) computer-readable program code means for building a personal profile database responsive to user input;

(b) computer-readable program code means for evaluating a media file obtained from the computer based upon the personal profile database; and, (c) computer-readable program code means for adjusting the personal profile database in response to a user's absorption of the media file.

49. A method for obtaining a media file from a computer, the method comprising the steps of:

(a) building a personal profile database containing user-specific information;

(b) retrieving a media file from the computer; and, (c) adjusting the personal profile database based on a user's absorption of the media file obtained from the computer.

* * * * *